(12) United States Patent
Jang et al.

(10) Patent No.: US 7,230,405 B2
(45) Date of Patent: Jun. 12, 2007

(54) NON-ISOLATED POWER CONVERSION SYSTEM HAVING MULTIPLE SWITCHING POWER CONVERTERS

(75) Inventors: Yungtaek Jang, Cary, NC (US); Milan Jovanović, Cary, NC (US)

(73) Assignee: Delta Electronics, Inc. (CH)

( * ) Notice: Subject to any disclaimer, the term of this patent is extended or adjusted under 35 U.S.C. 154(b) by 0 days.

(21) Appl. No.: 10/972,632

(22) Filed: Oct. 26, 2004

(65) Prior Publication Data

US 2006/0087295 A1    Apr. 27, 2006

(51) Int. Cl.
*G05F 1/00* (2006.01)
(52) U.S. Cl. .................. 323/222; 323/284; 323/282; 323/351
(58) Field of Classification Search .......... 323/222, 323/284, 282, 285, 351
See application file for complete search history.

(56) References Cited

U.S. PATENT DOCUMENTS

| 4,184,197 | A |   | 1/1980  | Cuk et al.       |         |
|-----------|---|---|---------|------------------|---------|
| 4,384,321 | A | * | 5/1983  | Rippel           | 363/124 |
| 4,816,739 | A | * | 3/1989  | Sakurai et al.   | 323/272 |
| 5,929,614 | A | * | 7/1999  | Copple           | 323/222 |
| 6,034,514 | A | * | 3/2000  | Sakai            | 323/225 |
| 6,144,194 | A | * | 11/2000 | Varga            | 323/285 |
| 6,404,175 | B1| * | 6/2002  | Yang et al.      | 323/282 |
| 6,628,106 | B1| * | 9/2003  | Batarseh et al.  | 323/222 |
| 6,690,122 | B2|   | 2/2004  | Weirich          |         |
| 6,803,750 | B2| * | 10/2004 | Zhang            | 323/222 |
| 6,839,252 | B2| * | 1/2005  | Tai et al.       | 323/272 |
| 6,879,135 | B2| * | 4/2005  | Fontanella       | 323/222 |

OTHER PUBLICATIONS

K. Nishijima, et al., "*Analysis of Double Step-Down Two-Phase Buck Converter for VRM*", Paper presented as part of the conference "27th International Telecommunications Energy Conference", Berlin, Germany, Sep. 18-22, 2005, www.intelec2005.de.
Zhou et al., "Investigation of Candidate VRM Topologies for Future Microprocessors", pp. 145-150, IEEE (1998).
Zhang et al., "A Novel High Performance Voltage Regulator Module", IEEE (2001).
W. Huang, "A New Control for Multi-phase Buck Converter with Fast Transient Response", IEEE (2001).
L. Franco et al., "A New High Static Gain Non-Isolated Dc-Dc Converter", pp. 1367-1373, IEEE (2003).
Guan, Peter, "Synchronous Buck Controller Extends Battery Life and Fits in a Small Footprint," *Linear Technology Magazine*, Feb. 2001, pp. 13-15.

* cited by examiner

*Primary Examiner*—Bao Q. Vu
(74) *Attorney, Agent, or Firm*—Venable LLP; Robert S. Babayi

(57) ABSTRACT

A non-isolated power conversion system has an input stage and an output stage. A plurality of cascaded switching power converter stages are coupled between the input stage and the output stage. Each of the plurality of switching power converter stages has at least one switch that is activated in accordance with a duty cycle associated with a switching cycle. At least one energy storage device temporarily stores energy that is proportional to the duty cycle during the switching cycle for delivery to the output stage.

18 Claims, 32 Drawing Sheets

[T₀-T₁]

[T₁-T₂]

[T₂-T₃]

[T₃-T₄]

NON-ISOLATED POWER CONVERSION SYSTEM HAVING MULTIPLE SWITCHING POWER CONVERTERS

BACKGROUND OF THE INVENTION

1. Field of the Invention

This invention generally relates to power conversion systems, more particularly to non-isolated power conversion systems that use multiple switching power converters.

2. Description of the Prior Art

Isolated and non-isolated power conversion systems are known. Isolated power supplies generally use a transformer for isolating an input power stage from an output power stage through primary and secondary windings. Non-isolated power conversion systems usually use cascaded switching power converter stages associated with one or more switching cycles.

Known non-isolated power converters have been used in AC-DC, AC-AC, DC-AC, and DC-DC applications. Examples of such converters include buck converters, boost converter and buck-boost converters that can be implemented using various switching power conversion topologies. In such topologies, the input/output conversion ratios are determined according to duty cycles associated with the switching cycles. For example, a boost converter is a step-up power converter having a voltage conversion ratio that is greater than 1. On the other hand, a buck converter is a step-down converter having a voltage conversion ratio that is less than 1. In other words, the input voltage of the boost converter is always less than or equal to the output voltage, whereas, the input voltage of the buck converter is always greater than or equal to the output voltage.

The buck converter topology has been extensively used in various DC-DC applications. In fact, the non-isolated voltage-regulation modules (VRM) of today's microprocessor power supplies are almost exclusively implemented with the buck topology. FIG. 1 shows a prior art buck converter that uses a single-inductor and a switching stage to provide an output voltage that is less than the input voltage. In this prior art converter, the output-to-input conversion ratio is equal to the duty cycle associated with the switching cycle.

This prior art buck converter and its known variations exhibit satisfactory performance in low-current applications. In high-current applications, however, it may be desirable to implement a multi-stage buck converter topology that comprises multiple switching stages and inductors. One such multi-stage buck converter used in high-current applications is shown in FIG. 2. Also, it is known to use multi-stage buck converters in low output voltages applications in order to improve conversion efficiency when conduction loss under a single-stage buck converter topology is severely degraded.

The buck converter of FIG. 2 uses buck topology in parallel. This topology is often used in high-current VRM applications to reduce current stress by operating more than one buck converter in parallel. The switching instances of each switch are interleaved, i.e., phase shifted, for 180 degrees. With such interleaving, the output current ripple is reduced and, consequently, the size of the output filter capacitor is minimized. Because the duty cycle of the conventional buck converter is proportional to the conversion ratio of input/output voltage in applications that use high switching frequencies for providing high conversion ratios, the turn-on periods of the switches are extremely short. Consequently, extremely narrow switch activation pulses are necessary for maintaining very short duty cycles. Generating very narrow turn-on switch activation control signals, however, is difficult because of parasitic components that are associated with the switching devices and the switch activation circuit.

In addition, a conventional buck converter in applications that require a high-voltage conversion ratio suffers from a serious efficiency degradation. This is because the blocking voltage of the switches in a conventional buck converter is equal to its input voltage. Thus, the voltage rating of the switching devices should be higher than the input voltage. Usually, high-voltage switching devices are more expensive and have greater conduction losses in comparison with low-voltage-rated switching devices. The efficiency of the conventional buck converter is further degraded by a severe switching loss. This is because the switching loss is approximately proportional to the square of the voltage across the switch during the instances when the switch is turned on and turned off.

Other known prior art approach to non-isolated power converters used in applications that require delivering high-voltage output from low-voltage input is a boost converter. Because the duty cycle of the conventional boost converter should be maximized to provide a very large conversion ratio of input/output voltage, the turn-on periods of the switches are extremely long. Consequently, extremely long switch conduction period increases conduction losses and lowers converter efficiency. Therefore, there exists a need for a power conversion system that includes multiple power converters to provide efficient power conversion, even at high conversion ratios.

SUMMARY OF THE INVENTION

The present invention discloses different embodiments of non-isolated multi-stage switching power converters that provide high conversion ratios in response to the duty cycle associated with a switching cycle of cascaded power converters. In one embodiment, the power converter is a step-down power converter that provides regulated low-voltage output at an output stage from high-voltage input at an input stage. The step-down power conversion system provides a power conversion ratio less than or equal to one. According to these embodiments, the step-down power conversion system of the invention operates with larger duty cycle that produces wider switch activation control signals applied to switches that lower voltage stresses and reduce switching losses.

In another embodiment, the power conversion system of the present invention is a step-up power conversion system that provides regulated high-voltage output at an output stage from a low-voltage input at an input stage. The step-up power conversion system provides a power conversion ratio greater than or equal to one. According to these embodiments, the step-up power conversion system of the invention operates with smaller duty cycle that reduces switch conduction losses.

Briefly, according to the present invention, a non-isolated power conversion system has an input stage and an output stage. A plurality of cascaded switching power converter stages are coupled between the input stage and the output stage. Each of the plurality of switching power converter stages has at least one switch that is activated in accordance with a duty cycle associated with a switching cycle. At least one energy storage device temporarily stores energy that is proportional to the duty cycle during the switching cycle for delivery to the output stage.

According to some of the more detailed features of the invention, the duty cycle is phase-shifted between corresponding switches of the plurality of switching power converter stages. According to another features of the invention, at least one energy storage device is coupled to adjacent switching power converter stages. Also, the energy storage device is a blocking capacitor.

According to other more detailed features of the invention, a junction point is between corresponding switches on adjacent switching power converter stages. Additionally, the junction point connects to the output stage through at least one energy storage device and an inductor. Also, each of the plurality of switching power converter stages have an inductor and a rectifier. The rectifier may be a diode rectifier or a synchronized rectifier switch.

According to additional features of the invention, at least one energy storage device is charged to provide the same volt-second product across the inductor for each of the plurality of switching power converter stages. Another feature of the present invention places a junction point that connects diode rectifiers from adjacent cascaded switching power converter stages, the junction point is connected to at least one inductor through the at least one energy storage device. Also, multiple pairs of switches, inductors, and energy storage devices are arranged in parallel for each of the plurality of switching power converter stages.

According to further additional features of the invention, activation of the at least one switch is at least one of turning-on or turning-off of the switch. A further embodiment of the present invention has the output device as a capacitor. Also, the energy storage device is charged to a fraction of an input voltage from the input stage.

According to yet another more detailed feature of the invention, A power conversion ratio of the plurality of switching power converter stages can be greater than one or alternatively less than or equal to one. A voltage of the energy storage device can be related to an input voltage from the input stage and to the duty cycle. Alternatively, a voltage of the energy storage device can be related to an output voltage of the output stage and to the duty cycle. Also, a plurality of energy storage devices may be arranged in parallel.

In yet further detailed features of the invention, the circuits of this invention can be implemented in a variety of ways. Specifically, multiple pairs of switches, diode rectifiers, and capacitors can be connected in parallel to reduce the current stresses in the power conversion system. Also, the power conversion system could be connected in parallel for high current applications.

DETAILED DESCRIPTION OF THE INVENTION

The power conversion system of the present invention is described in terms of multiple switching power converter stages that provide conversion ratios in response to a duty cycle associated with a switching cycle. The multiple switching power converter stages are cascaded in accordance with the present invention.

In one embodiment, the power conversion system of the invention comprises a step-down power conversion system that provides regulated low-voltage output at an output stage from a high-voltage input at an input stage. The step-down power conversion system provides a power conversion ratio less than or equal to one. According to these embodiments, the power conversion system of the invention operates with larger duty cycle that produces wide switch activation control signals applied to switches that lower voltage stresses and reduce switching losses.

In another embodiment, the power conversion system of the present invention is a step-up power conversion system that provides regulated high-voltage output at an output stage from a low-voltage input at an input stage. The step-up power conversion system provides a power conversion ratio greater than or equal to one. According to these embodiments, the step-up power conversion system of the invention operates with smaller duty cycle that reduces switch conduction losses.

Figure 1:
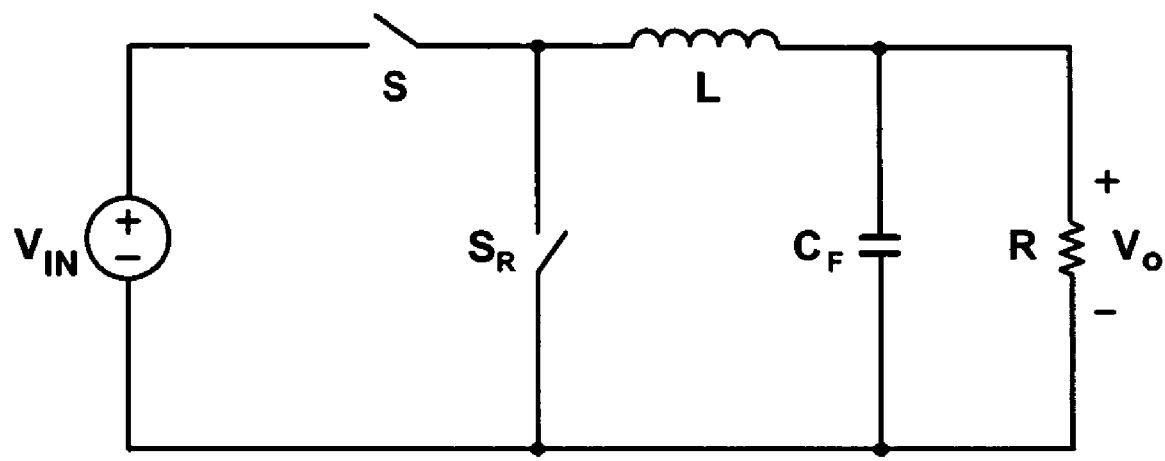
FIG. 1 shows a conventional power conversion system in a buck arrangement.
Figure 2:
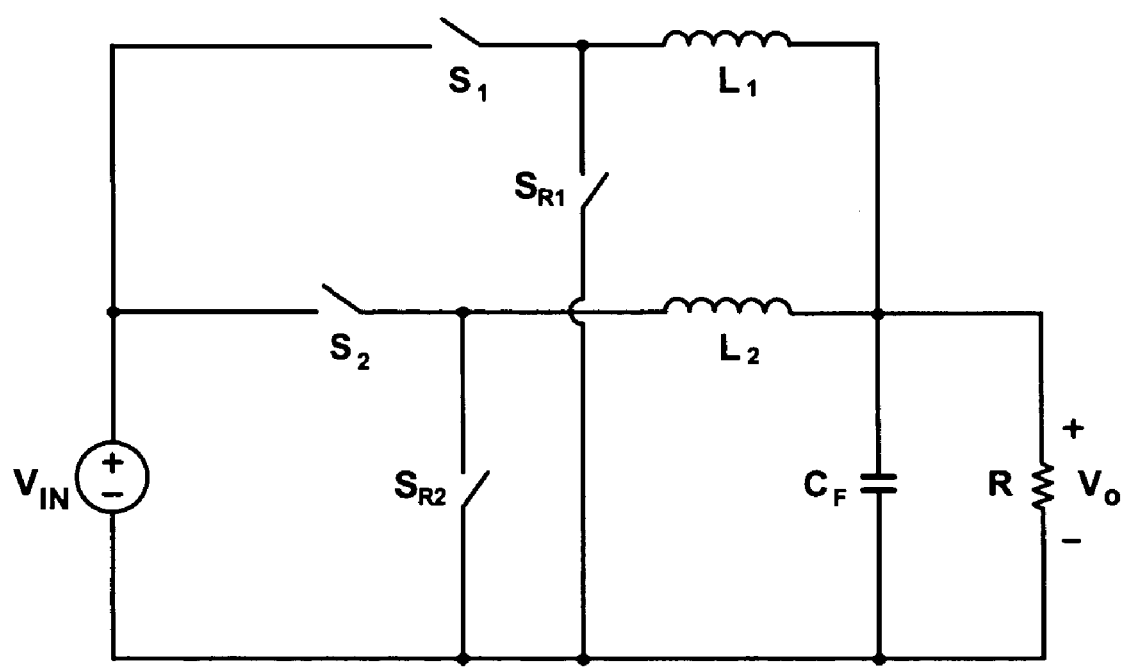
FIG. 2 shows a conventional arrangement for a buck power conversion system that comprises multi-stage converters.
Figure 3:
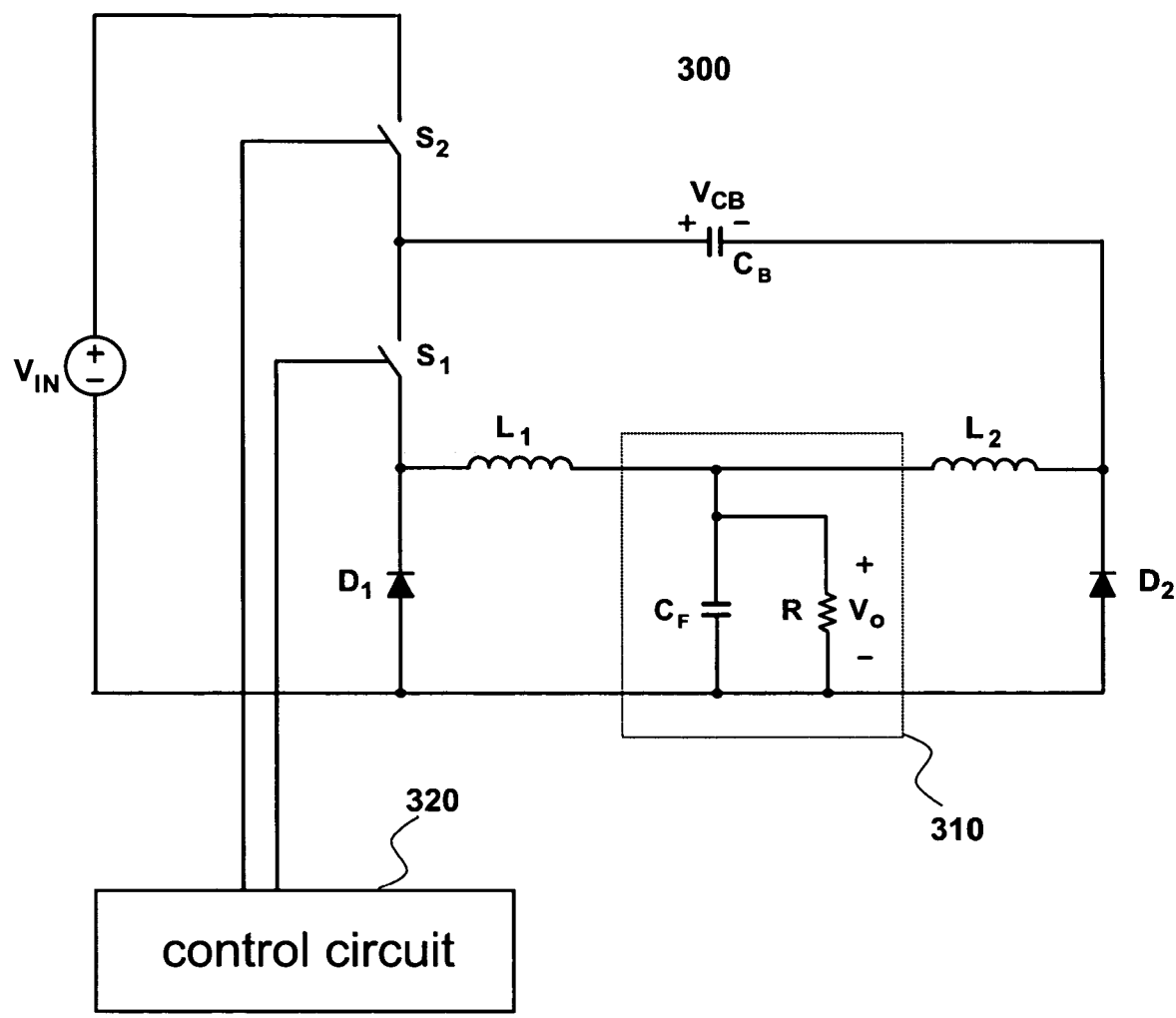
FIG. 3 shows schematic diagram of a 2-stage non-isolated two-switch, two-inductor, cascaded step-down power converter of this invention.

FIG. 3 shows the schematic diagram of a non-isolated step-down (or buck) 2-stage power conversion system 300 according to an exemplary embodiment of the present invention. The power conversion system 300 comprises switches $S_1$ and $S_2$, inductors $L_1$ and $L_2$, a energy storage device (or blocking capacitor) $C_B$, diode rectifiers $D_1$ and $D_2$, and output capacitor $C_F$ connected across load R.

In this exemplary embodiment, a first switching power converter stage comprises switch $S_1$, output inductor $L_1$ and output diode rectifier $D_1$. As described later in detail, this switching power converter stage, during one switching cycle, temporarily provides a voltage across output inductor $L_1$ and output capacitor $C_F$ that is equal to the blocking capacitor voltage $V_{CB}$. A second switching power converter stage comprises switch $S_2$, output inductor $L_2$ and output diode rectifier $D_2$. During another phase shifted switching cycle, this switching power converter stage temporarily provides a voltage across output inductor $L_2$ and output capacitor $C_F$ that is equal to the input stage voltage $V_{IN}$ minus the blocking capacitor voltage $V_{CB}$.

As shown in FIG. 3, switches $S_1$ and $S_2$ are on cascaded switching power converter stages that can be viewed as connected in series between the input stage and the output stage 310. The input stage comprises a voltage source $V_{IN}$, and the output stage comprises an output capacitor $C_F$. Between the series connected switches $S_1$ and $S_2$ is a junction point that connects to the output stage through blocking capacitor $C_B$ and inductor $L_2$. Switching power converter stages that share a junction point are adjacent, and two or more switching power converter stages coupled together are cascaded.

As depicted in FIG. 3, the energy storage device (blocking capacitor) $C_B$ is coupled to the first and second switching power converter stages. Blocking capacitor $C_B$ acts as a voltage divider to divide the input voltage $V_{IN}$. In this arrangement, the blocking capacitor $C_B$ temporarily stores energy during a switching cycle for delivery to the output stage such that the temporarily stored energy is proportional to the duty cycle. During steady state, the voltage across the blocking capacitor is the output voltage $V_o$ divided by the duty cycle D.

More specifically, during the steady state operation, the energy storage device (blocking capacitor) $C_B$ is temporarily charged with a fraction of the input voltage $V_{IN}$ to provide the same volt-second product across each individual inductor $L_1$ and $L_2$ for each of the switching power converter stages. Consequently, the duty cycle of the power conversion system 300 can be increased, relative to conventional buck converters, in order to provide the same volt-second product. As a result, the step-down power converter of the invention can be designed to operate with relatively wide-pulse turn-on switch activation control signals, even at high switching frequencies. Moreover, because the blocking capacitor voltage $V_{CB}$ across the switches $S_1$ and $S_2$ is only a fraction of the input voltage $V_{IN}$, more efficient low-voltage rated semiconductor devices may be employed to reduce conduction losses. A control circuit 320 generates switch activation control signals to control the switches $S_1$ and $S_2$ in a phase-shifted manner, as described below.

Figure 4:
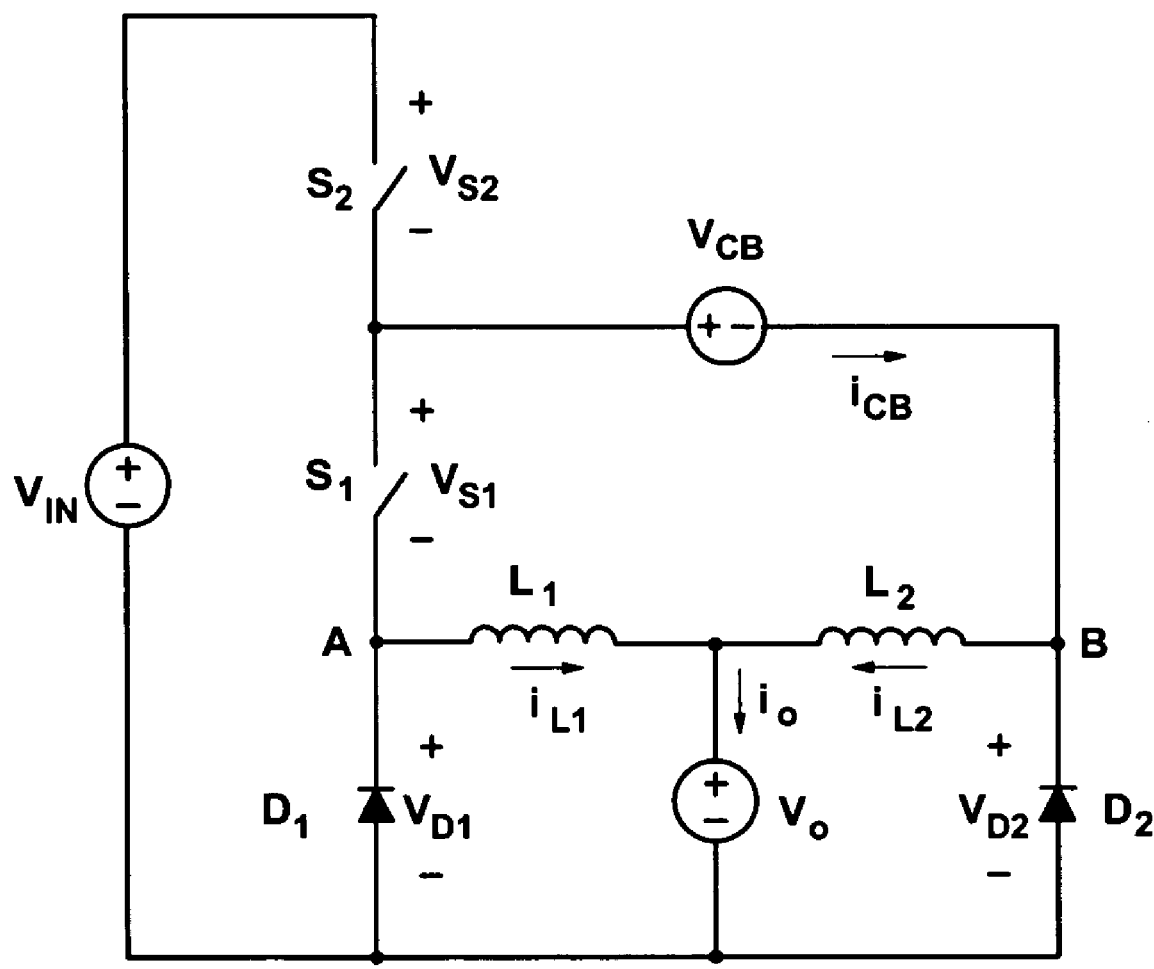
FIG. 4 shows a simplified circuit for the power conversion system of FIG. 3.

FIG. 4 shows a simplified circuit diagram of the 2-stage non-isolated power conversion system of FIG. 3. In the simplified circuit diagram, capacitor $C_B$ has been idealized as a voltage source $V_{CB}$, and output capacitor $C_F$ has been idealized as a voltage source $V_o$. The intersection of switch $S_1$, inductor $L_1$, and diode rectifier $D_1$ is interconnection A. The intersection of capacitor $C_B$, inductor $L_2$, and diode rectifier $D_2$ is interconnection B. In the simplified circuit, it is assumed that output capacitor $C_F$ and blocking capacitor $C_B$ are large enough so that the voltage ripples across them are small compared to their DC voltages. Moreover, in this analysis, it is also assumed that all semiconductor components are ideal, i.e., they represent zero impedances in the 'on' state and infinite impedances in the 'off' state. Finally, it is assumed that the conducting duty cycle periods of switches $S_1$ and $S_2$ are identical.

Figure 5A:
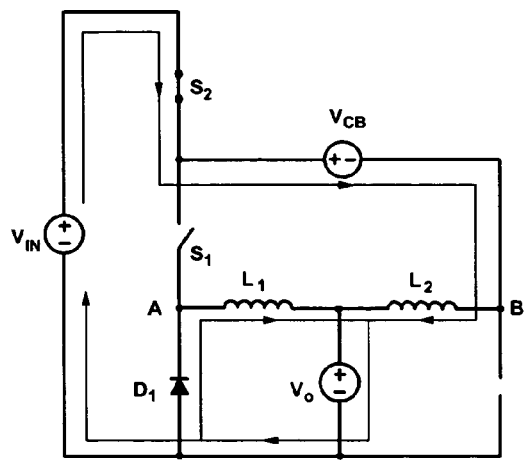
FIG. 5(a)–5(d) shows topological stages of the circuit shown in FIG. 4 during a switching cycle.
Figure 5B:
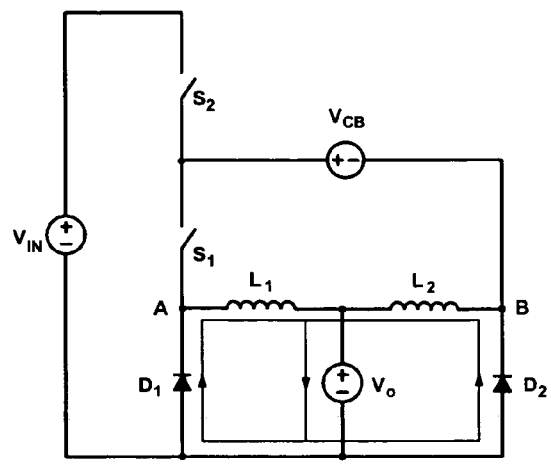
Figure 5C:
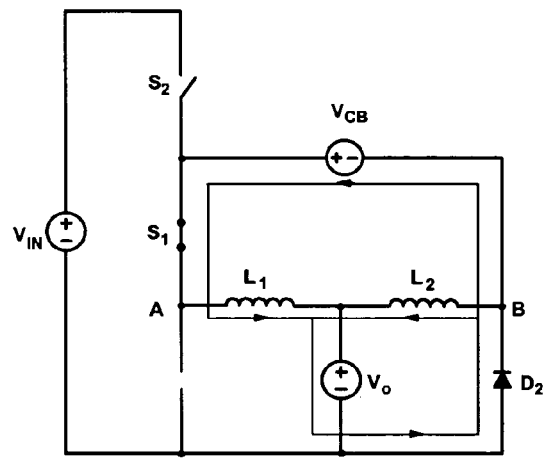
Figure 5D:
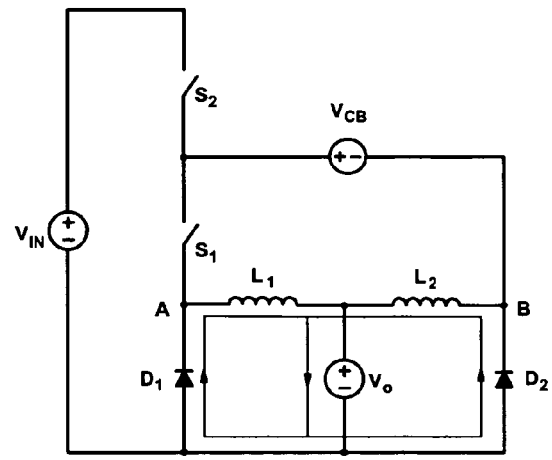
Figure 6:
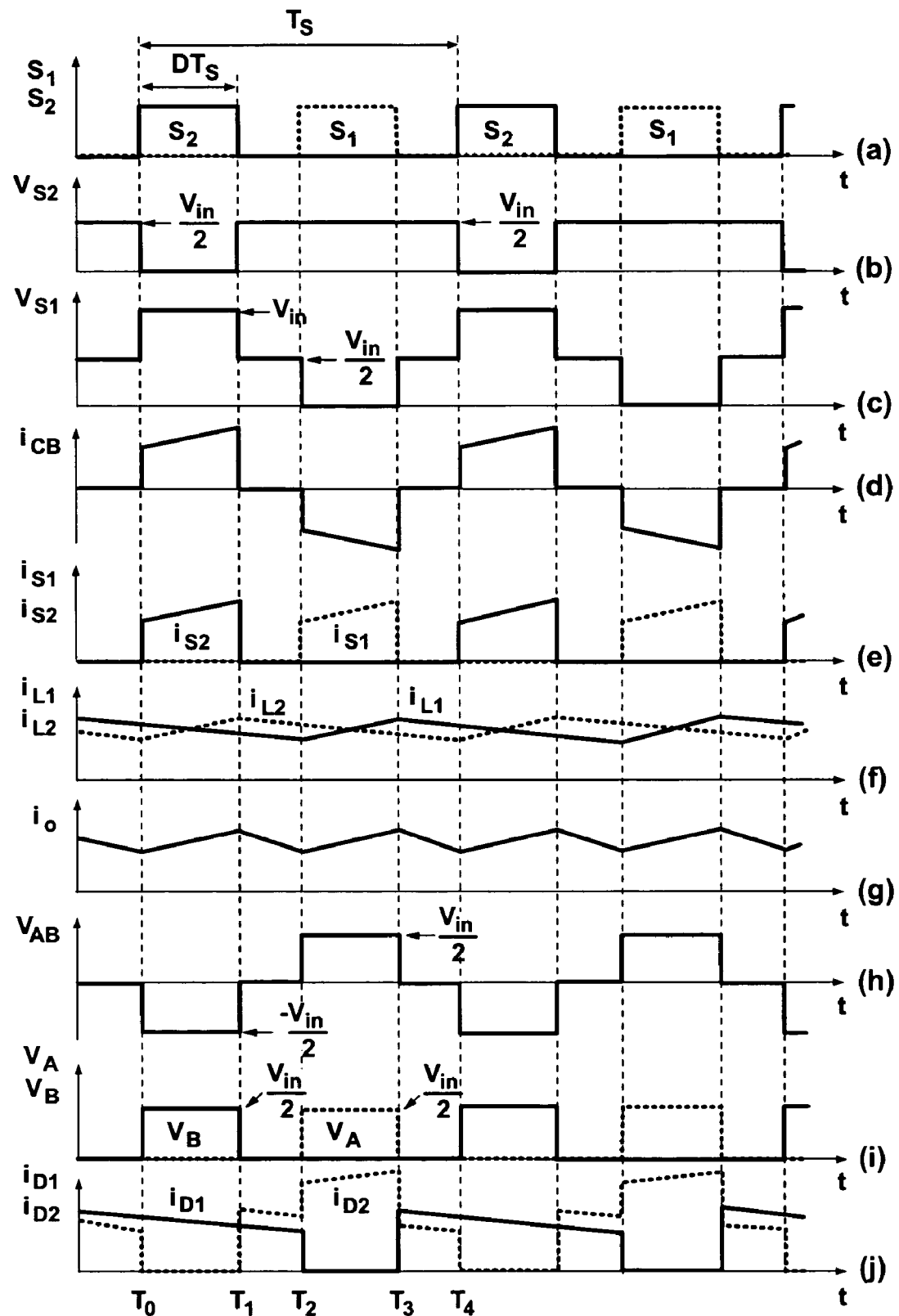
FIG. 6 shows voltage and current waveforms for various components in the circuit shown in FIG. 4.

FIG. 5 shows the topological stages of the circuit diagram of FIG. 4 during a switching cycle, whereas FIG. 6 shows its key waveforms. The reference directions of currents and voltages plotted in FIG. 6 are shown in FIG. 4 to indicate the polarity of the waveforms. As can be seen from the timing diagrams of FIG. 6(a), the activation of switches $S_1$ and $S_2$ is phase-shifted, i.e., delayed, on adjacent switching power converter stages according to switch activation control signals. The turn-on moment of switch $S_1$ is phase-shifted 180 degrees from the turn-on moment of switch $S_2$. The switch activation control signals either close (turn-on) or open (turn-off) the switch receiving the signal. The conducting time of each switch represents duty cycle D of the converter, and the switches operate with a switching cycle $T_S$, as illustrated in FIG. 6(a). It would be appreciated that the duty cycle D and the switching cycle $T_S$ have a fractional relationship with each other, and the duration of the duty cycle is within the duration of the switching cycle. It should be noted that FIGS. 5 and 6 describe the power conversion system of the invention for operation with a duty cycle of less than 0.5, i.e., D<0.5.

FIGS. 6(a)–6(f) depict the activation, voltage, and current waveforms for the circuit components in the switching power converter stages according to the switch activation control signals for switches $S_1$ and $S_2$. FIG. 6(b) depicts the voltage waveform $V_{S2}$ across switch $S_2$, FIG. 6(c) depicts the voltage waveform $V_{S1}$ across switch $S_1$, FIG. 6(d) illustrates current waveform $i_{CB}$ across capacitor $C_B$, FIG. 6(e) depicts the current waveforms $i_{S1}$ and $i_{S2}$ across switches $S_1$ and $S_2$, respectively, FIG. 6(f) illustrates the current waveforms $i_{L1}$ and $i_{L2}$ across inductors $L_1$ and $L_2$, respectively, FIG. 6(g) depicts the current waveform $i_o$ across output capacitor $C_F$, FIG. 6(h) illustrates voltage waveform $V_{AB}$ across interconnections A and B, FIG. 6(i) depicts the voltage waveforms $V_A$ and $V_B$ measured at interconnections A and B, respectively, FIG. 6(j) illustrates the current waveforms $i_{D1}$ and $i_{D2}$ across diode rectifiers $D_1$ and $D_2$, respectively.

It should be understood that the FIGS. 6(a)–(j) depict idealized waveforms, and that the actual waveforms would contain noise and other non-ideal component characteristics that would affect the appearance of the measured waveforms, as one of ordinary skill in the art would understand. Accordingly, the circuit components of the present invention behave similarly to the waveforms depicted, but include inherent non-idealities. The current and voltage waveforms are for illustrative purposes only, and are not intended to depict actual voltage and current waveforms measured from the circuit.

In steady state operation, with a duty cycle D of less than 0.5, the voltage across blocking capacitor $C_B$ is one-half of input voltage $V_{IN}$, i.e., $V_{CB}=V_{IN}/2$. FIG. 5(a) illustrates the time interval when switch $S_2$ is on, i.e., during the time interval $T_0$–$T_1$ in FIG. 6. In this interval, the input current flows through blocking switch $S_2$, capacitor $C_B$, and inductor $L_2$ into output voltage source $V_O$, while the current in inductor $L_1$ flows through diode rectifier $D_1$ into output voltage source $V_O$. The input voltage $V_{IN}$ is divided between the blocking capacitor $C_B$ and the output stage. The voltage across output inductor $L_2$ and output capacitor $C_F$ at the output stage is the difference between the input voltage $V_{IN}$ and the voltage $V_{CB}$ across the blocking capacitor $C_B$. During the time interval $T_0$–$T_1$, inductor current $i_{L2}$ is increasing at the rate $$\frac{di_{L2}}{dt} = \frac{V_{IN} - V_C - V_0}{L_2} = \frac{\frac{V_{IN}}{2} - V_0}{L_2}, \quad (1)$$

while inductor current $i_{L1}$ is decreasing at the rate $$\frac{di_{L1}}{dt} = \frac{-V_0}{L_1} \quad (2)$$

When at $t=T_1$, switch $S_2$ is turned off, inductor current $i_{L2}$ is diverted from switch $S_2$ to diode rectifier $D_2$, as shown in FIG. 5(b), and the energy stored in inductor $L_2$ starts to discharge into voltage source $V_O$. During the time interval $T_1$–$T_2$, current $i_{L2}$ decreases at the rate $$\frac{di_{L2}}{dt} = \frac{-V_0}{L_2}, \quad (3)$$

while inductor current $i_{L1}$ continues to decrease at the rate given in Eq. (2).

When at $t=T_2$, switch $S_1$ is turned on, the circuit enters the topological stage shown in FIG. 5(c). During the time interval $T_2$–$T_3$ in FIG. 6, inductor current $i_{L1}$ flows through diode rectifier $D_2$, capacitor $C_B$, switch $S_1$ and inductor $L_1$ into the output while the current in inductor $L_2$ flows through diode rectifier $D_2$ into the output, as shown in FIG. 5(c). The voltage across output inductor $L_1$ and output capacitor $C_F$ is equal to the voltage $V_{CB}$ of the blocking capacitor $C_B$. During the time interval $T_2$–$T_3$, inductor current $i_{L1}$ is increasing at the rate $$\frac{di_{L1}}{dt} = \frac{V_C - V_0}{L_1} = \frac{\frac{V_{IN}}{2} - V_0}{L_1}, \quad (4)$$

while inductor current $i_{L2}$ is decreasing at the rate given in Eq. (3).

When at $t=T_3$, switch $S_1$ is turned off, the circuit enters the topological stage shown in FIG. 5(d), which is identical to the topological stage in FIG. 5(b). During this stage, both switches are off and both inductor currents $i_{L1}$ and $i_{L2}$ decrease at the same rates given by Eqs. (2) and (3). The circuit enters a new switching cycle at $t=T_4$ when switch $S_2$ is turned on again.

The voltage conversion ratio of the circuit can be calculated from the volt-second balance of the output inductors. From Eqs. (1) and (3), the volt-second balance equation for $L_2$ is $$\left(\frac{V_{IN}}{2} - V_0\right) DT_S = V_0(T_S - DT_S) \quad (5)$$

so that $$\frac{V_0}{V_{IN}} = \frac{D}{2} \text{ for } D \leq 0.5. \quad (6)$$

As can be seen from Eq. (6), the output voltage of the power conversion system in FIG. 3 is one-half of the output voltage of a conventional buck converter when they operate at the same duty cycle. This high conversion ratio makes the converter suitable for applications with a high difference between the input and output voltages, since the power conversion systems do not have to work with narrow switch activation control signals.

It should be noted that the switch voltages shown in FIGS. 6(b) and (c) are charging only to one-half of input voltage $V_{IN}$ during the instances when switches $S_1$ and $S_2$ are turned on and turned off. Because a switching loss is approximately proportional to the square of the voltage charge across a switch during the switch turn on and turn off time, the switching loss of the power conversion system is approximately one-quarter of that of the conventional buck converter. In addition, because a low-voltage stress on the switches, the converter can employ more efficient low-voltage-rated semiconductor switches.

For the operation with a duty cycle greater than 0.5, i.e., D>0.5, the voltage conversion ratio of the circuit in FIG. 3 becomes $$\frac{V_0}{V_{IN}} = D^2. \quad (7)$$

Figure 7:
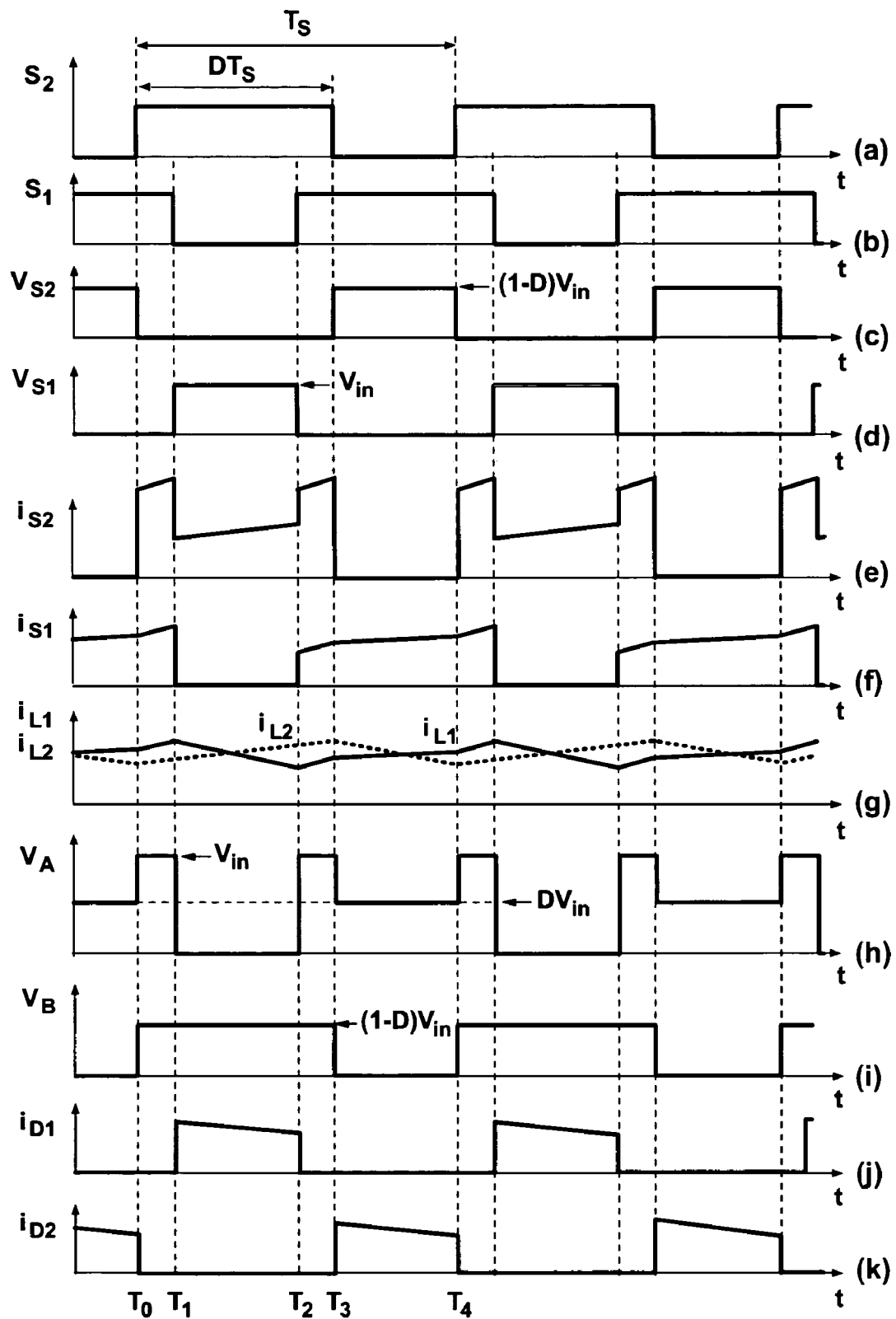
FIG. 7 shows additional voltage and current waveforms for the circuit shown in FIG. 4.

FIG. 7 shows the timing diagrams for the current and voltage waveforms of the switching power converter stage when it operates with duty cycle D greater than 0.5 as switches $S_1$ and $S_2$ operate according to the switch activation control signals. FIG. 7(a) depicts the activation waveform of switch $S_2$, FIG. 7(b) depicts the activation waveform of switch $S_1$, FIG. 7(c) depicts the voltage waveform $V_{S2}$ across switch $S_2$, FIG. 7(d) depicts the voltage waveform $V_{S1}$ across switch $S_1$, FIG. 7(e) depicts the current waveform $i_{S2}$ across switch $S_2$, FIG. 7(f) depicts the current waveform $i_{S1}$ across switch $S_1$, FIG. 7(g) depicts the current waveforms $i_{L1}$ and $i_{L2}$ across inductors $L_1$ and $L_2$, respectively, FIG. 7(h) depicts the voltage waveform $V_A$ measured at interconnection A, FIG. 7(i) depicts the voltage waveform $V_B$ measured at interconnection B, FIG. 7(j) depicts the current waveform $i_{D1}$ across diode rectifier $D_1$, and FIG. 7(k) depicts the current waveform $i_{D2}$ across diode rectifier $D_2$.

Figure 8:
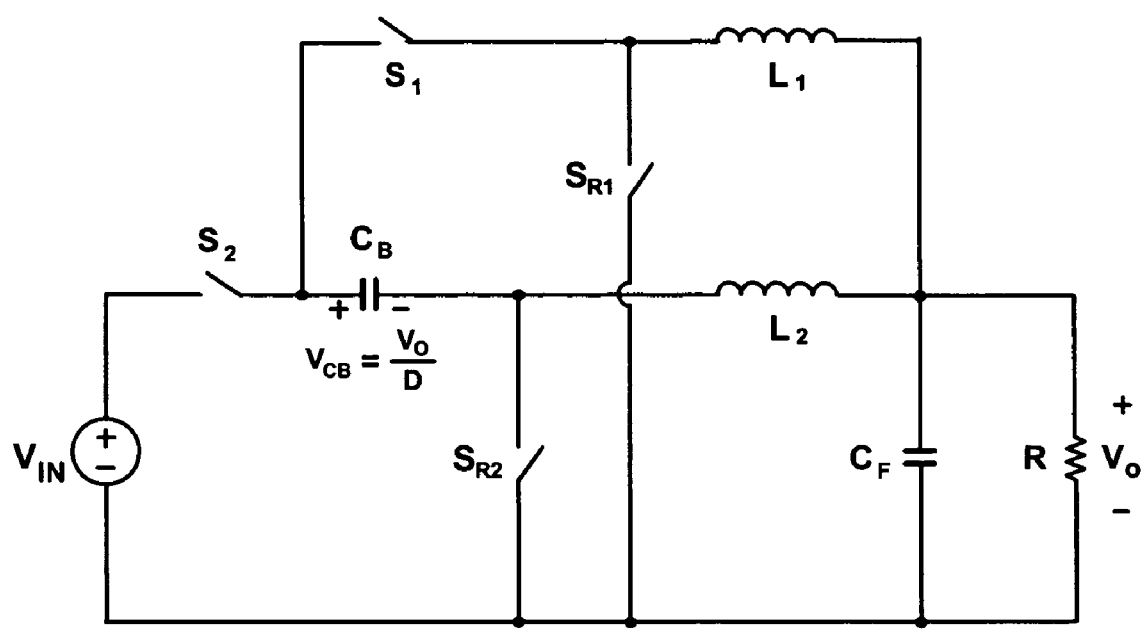
FIG. 8 shows a power conversion system according to another embodiment of the present invention introducing synchronized rectifiers into the circuit of FIG. 3.

In another embodiment, the non-isolated power conversion system of the invention can be implemented with synchronized rectifier switches instead of diode rectifiers. As shown in FIG. 8, in this implementation, diode rectifiers $D_1$ and $D_2$ of the converter in FIG. 3 are replaced by synchronized rectifier switches $S_{R1}$ and $S_{R2}$. Since the maximum voltages of switches $S_{R1}$ and $S_{R2}$ are one half of input voltage $V_{IN}$, synchronized rectifier switches $S_{R1}$ and $S_{R2}$ can also be implemented with more efficient low-voltage rated semiconductor devices.

Figure 9:
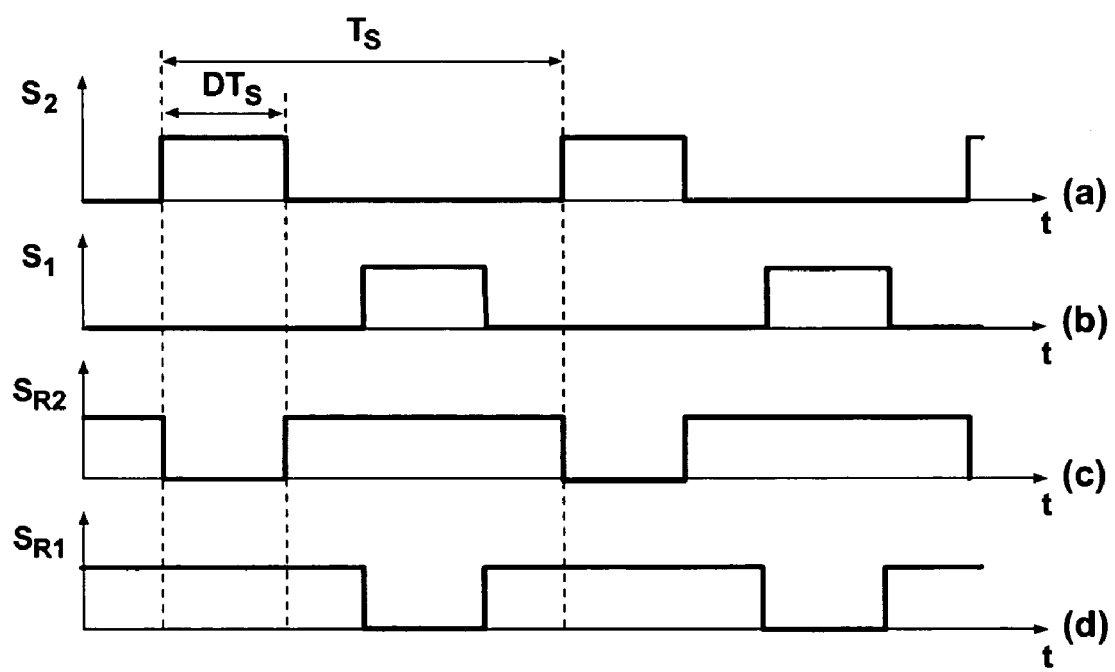
FIG. 9 shows the activation timing diagrams of the switch activation control signals for the circuit in FIG. 8.

FIG. 9 shows the timing diagrams of the switches $S_1$ and $S_2$ and synchronized rectifier switches $S_{R1}$ and $S_{R2}$ of the switching power converter stage in FIG. 8 according to switch activation control signals. Since the activation of switches $S_1$ and $S_2$ is phase-shifted on the adjacent switching power converter stages, the output current ripple of the power conversion system is reduced, and the size of the output filter capacitor is minimized. FIG. 9(a) depicts the activation waveform of switch $S_2$, FIG. 9(b) depicts the activation waveform of switch $S_1$, FIG. 9(c) depicts the activation waveform of synchronized rectifier switch $S_{R2}$, and FIG. 9(d) depicts the activation waveform of synchronized rectifier switch $S_{R1}$. It would be appreciated that switch $S_2$ and synchronized rectifier switch $S_{R2}$ are conducting at complementary intervals. The switch $S_2$ conducts during the duty cycle D of its switching power converter stage, whereas the synchronized rectifier switch $S_{R2}$ is conducting during the remainder to the switching cycle $T_S$. The same relationship applies to switch $S_1$ and synchronized rectifier switch $S_{R1}$.

Figure 10:
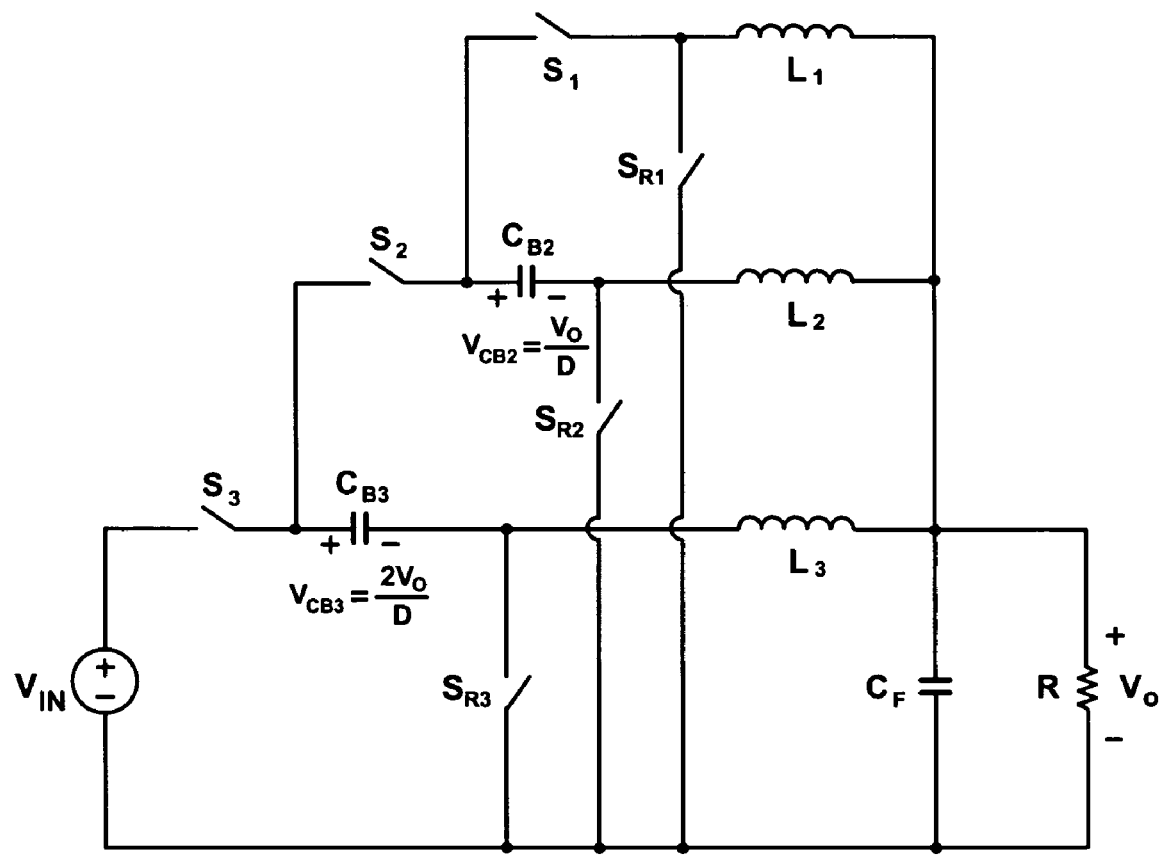
FIG. 10 shows a 3-stage non-isolated three-switch, three-inductor, cascaded step-down power converter of this invention.

FIG. 10 shows a 3-stage non-isolated cascaded switching power converter according to the present invention. Switches $S_1$, $S_2$, and $S_3$ are activated at phase-shifted, i.e., delayed, intervals of 120 degrees, as will be described below in FIG. 11. As shown in FIG. 10, the power conversion system employs three switches, $S_1$, $S_2$, and $S_3$, connected in series between an input stage and inductors $L_1$, $L_2$, $L_3$, respectively, to an output stage. The output stage is further coupled to a load R. In this embodiment, the input stage comprises a voltage source $V_{IN}$, and the output stage comprises an output capacitor $C_F$. Between switches $S_1$ and $S_2$ is a first junction point connected to inductor $L_2$ through an energy storage device (blocking capacitor) $C_{B2}$. The voltage across capacitor $C_{B2}$ is the output voltage $V_o$ divided by the duty cycle D. Between switches $S_2$ and $S_3$ is a second junction point connected to inductor $L_3$ through an energy storage device (blocking capacitor) $C_{B3}$. The voltage across capacitor $C_{B3}$ is two times the output voltage $V_o$ divided by the duty cycle D. As a general rule for multiple step-down switching power converter stages, the voltage across the blocking capacitor coupled to a junction point is equal to the stage number of the lower switching power converter stage coupled to the junction point, multiplied by the output voltage, and divided by the duty cycle D. Therefore, the junction point between the second and third switching power converter stages is two, multiplied by output voltage $V_o$, and divided by duty cycle D.

In this embodiment, the first switching power converter stage comprises switch $S_1$, inductor $L_1$, and synchronized rectifier switch $S_{R1}$, the second switching power converter stage comprises switch $S_2$, inductor $L_2$, and synchronized rectifier switch $S_{R2}$, and the third switching power converter stage comprises switch $S_3$, inductor $L_3$, and synchronized rectifier switch $S_{R3}$. Switching power converter stages that share a junction point are adjacent switching power converter stages. In the present embodiment, the first and second switching power converter stages are adjacent, and the second and third switching power converter stages are adjacent. The first, second, and third switching power converter stages are coupled together and are a cascaded switching power converter stage.

During the steady-state operation, blocking capacitors $C_{B2}$ and $C_{B3}$ adjust their DC voltages so that they provide the same volt-second condition across inductors $L_1$, $L_2$, and $L_3$. The voltage conversion ratio of the circuit calculated from the volt-second balance of the inductors is $$\frac{V_0}{V_{IN}} = \frac{D}{3} \tag{8}$$

when it operates with duty cycle D less than one-third. As can be seen from Eq. (8), for the same duty cycle, the output voltage of the power conversion system in FIG. 10 is one-third the output voltage of the conventional buck converter. When the converter operates with a duty cycle greater than one-third, the voltage conversion ratio monotonically increases from D/3 to 1.

Figure 11:
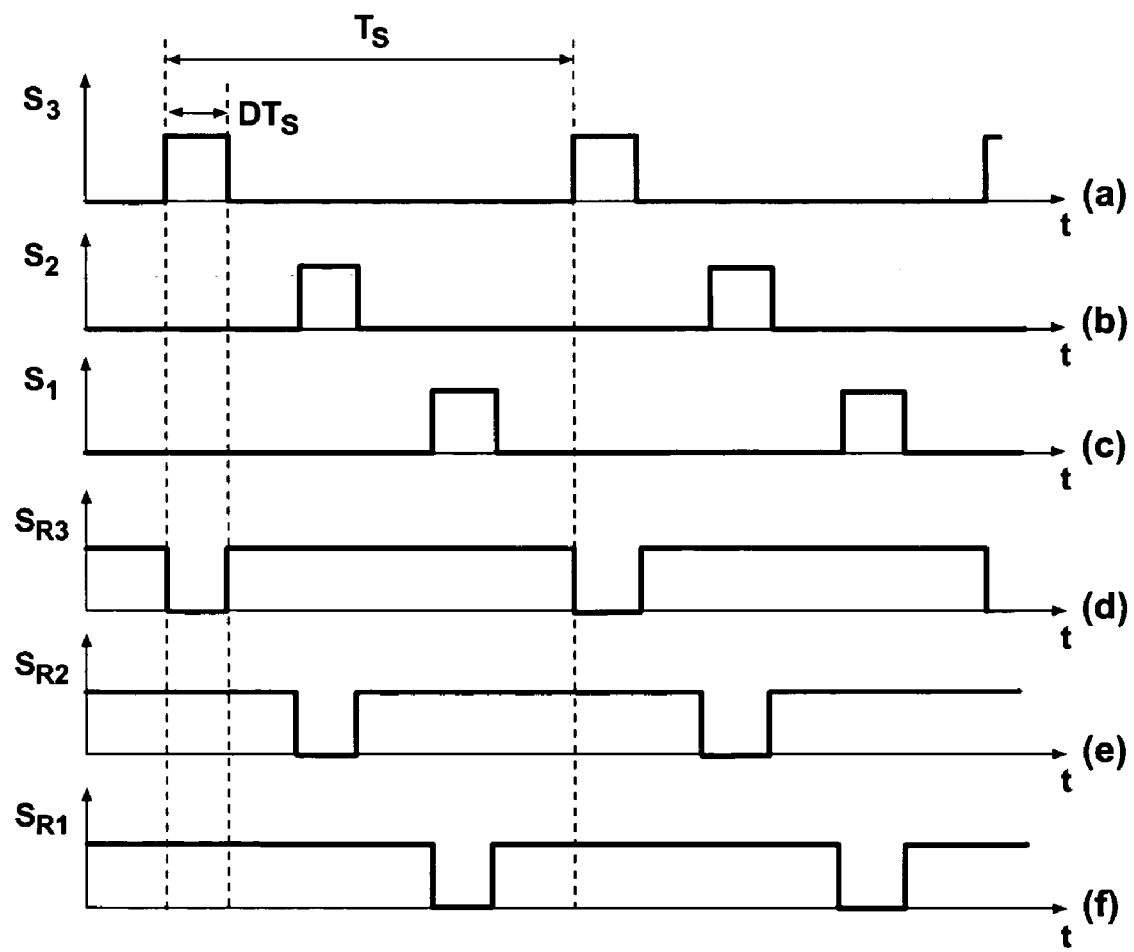
FIG. 11 shows the activation timing diagrams of the switch activation control signals for the circuit in FIG. 10.

FIG. 11 shows the timing diagrams of switches $S_1$, $S_2$ and $S_3$ and synchronized rectifier switches $S_{R1}$, $S_{R2}$, and $S_{R3}$ of the respective switching power converter stages depicted in FIG. 10 according to the switch activation control signals. Switches $S_1$, $S_2$ and $S_3$ are activated at phase-shifted intervals of 120 degrees, wherein each switch conducts during a duty cycle that is out of phase with the other switches. Since switches $S_1$, $S_2$ and $S_3$ are activated in phase-shifted intervals on adjacent switching power converter stages, the output current ripple of the power conversion system is reduced, and the size of the output filter capacitor is minimized. FIG. 11(a) depicts the activation waveform of switch $S_3$, FIG. 11(b) depicts the activation waveform of switch $S_2$, FIG. 11(c) depicts the activation waveform of switch $S_1$, FIG. 11(d) depicts the activation waveform of synchronized rectifier switch $S_{R3}$, FIG. 11(e) depicts the activation waveform of synchronized rectifier switch $S_{R2}$, and FIG. 11(f) depicts the activation waveform of synchronized rectifier switch $S_{R1}$. It would be appreciated that switch $S_3$ and synchronized rectifier switch $S_{R3}$ are conducting at complementary intervals. The switch $S_3$ conducts during the duty cycle D of its switching power converter stage, whereas the synchronized rectifier switch $S_{R3}$ is conducting during the remainder to the switching cycle $T_S$. The same relationship applies to switches $S_2$, $S_1$ and synchronized rectifier switch $S_{R2}$, $S_{R1}$, respectively.

Figure 12:
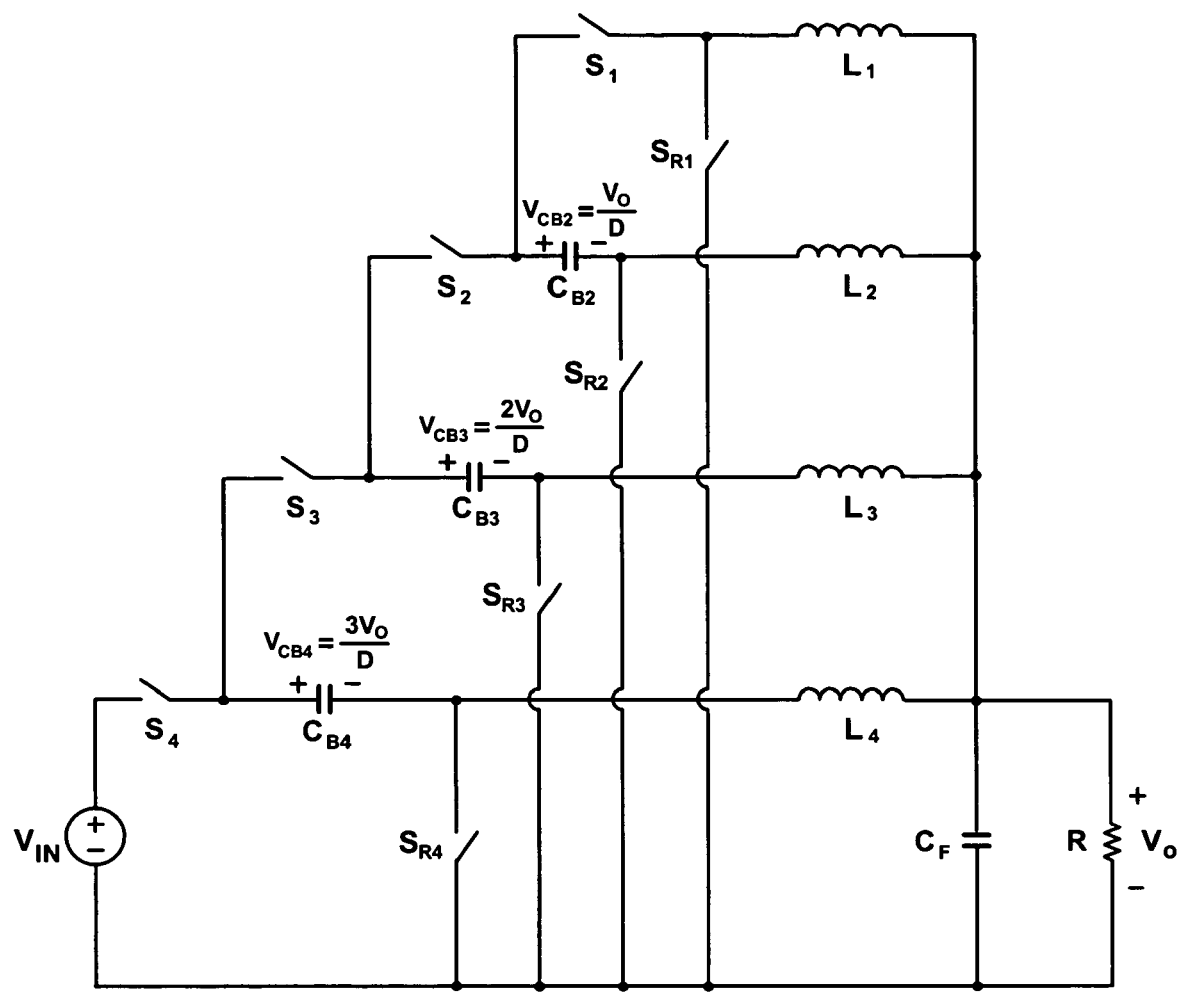
FIG. 12 shows a 4-stage non-isolated four-switch, four-inductor, cascaded step-down power of this invention.

FIG. 12 shows another arrangement of a 4-stage cascaded switching power converter used in accordance with the present invention. This figure depicts an arrangement with four switching power converter stages, where each of the switching power converter stages is identified similar to the description given for FIG. 10. In the present embodiment, the circuit can be operated according to switch activation control signals depicted in FIG. 13 or those in FIG. 14.

Figure 13:
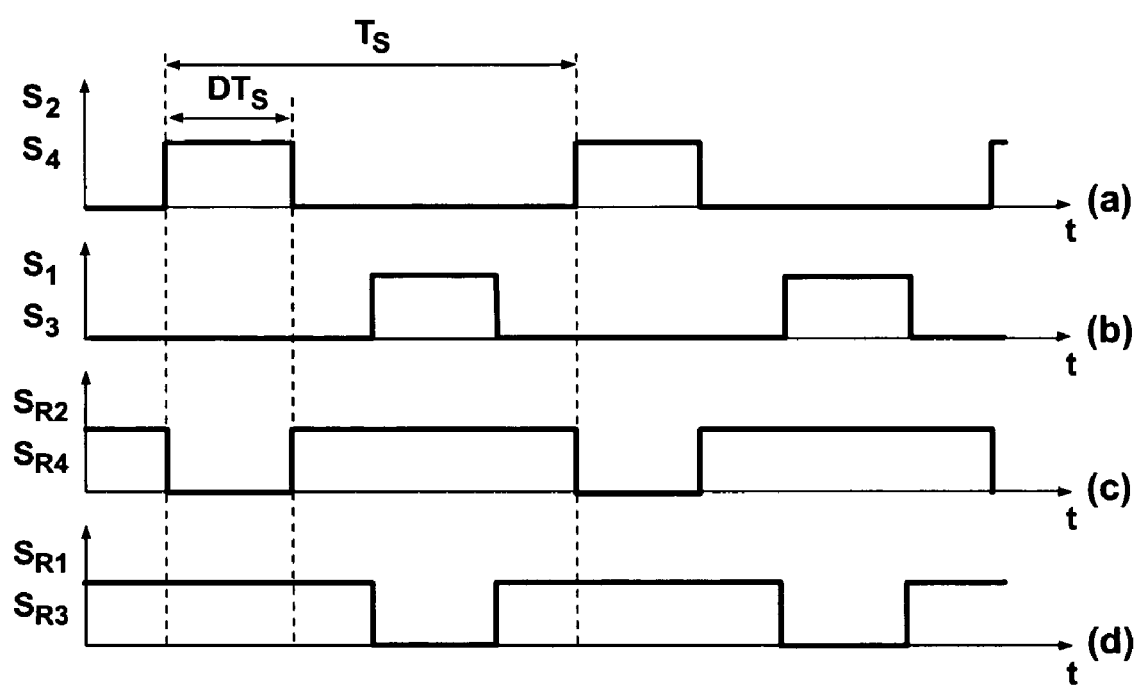
FIG. 13 shows the activation timing diagrams of the switch activation control signals for the circuit in FIG. 12.

FIG. 13 depicts the timing diagrams of switches $S_1$, $S_2$, $S_3$, and $S_4$ and synchronized rectifier switches $S_{R1}$, $S_{R2}$, $S_{R3}$ and $S_{R4}$ of respective switching power converter stages depicted in FIG. 12 according to the switching activation controls signals. Switches $S_1$ and $S_3$ are the odd switches, and switches $S_2$ and $S_4$ are the even switches because of which switching power converter stage they are located on. The duty cycles for switches on the even switching power converter stages are phase-shifted by 180 degrees relative to the odd switching power converter stages, therefore the odd and even switches are out of phase with respect to one another. Since the activation of switches $S_1$, $S_2$, $S_3$, and $S_4$ are on phase-shifted duty cycle intervals of adjacent switching power converter stages, the output current ripple of the power conversion system is reduced, and the size of the output capacitor is thereby minimized. FIG. 13(a) depicts the concurrent activation waveforms of switches $S_2$ and $S_4$, FIG. 13(b) depicts the concurrent activation waveforms of switches $S_1$ and $S_3$, FIG. 13(c) depicts the concurrent activation waveforms of synchronized rectifier switches $S_{R2}$ and $S_{R4}$, and FIG. 13(d) depicts the concurrent activation waveforms of synchronized rectifier switches $S_{R1}$ and $S_{R3}$. It would be appreciated that even switches $S_2$, $S_4$ and even synchronized rectifier switches $S_{R2}$, $S_{R4}$ are conducting at complementary intervals. The even switches $S_2$, $S_4$ conduct during the duty cycle D of their respective even switching power converter stages, whereas the even synchronized rectifier switches $S_{R2}$, $S_{R4}$ are conducting during the remainder to the switching cycle $T_S$. The same relationship applies to switches $S_1$, $S_3$ and synchronized rectifier switches $S_{R1}$, $S_{R3}$ of the odd switching power converter stages.

Figure 14:
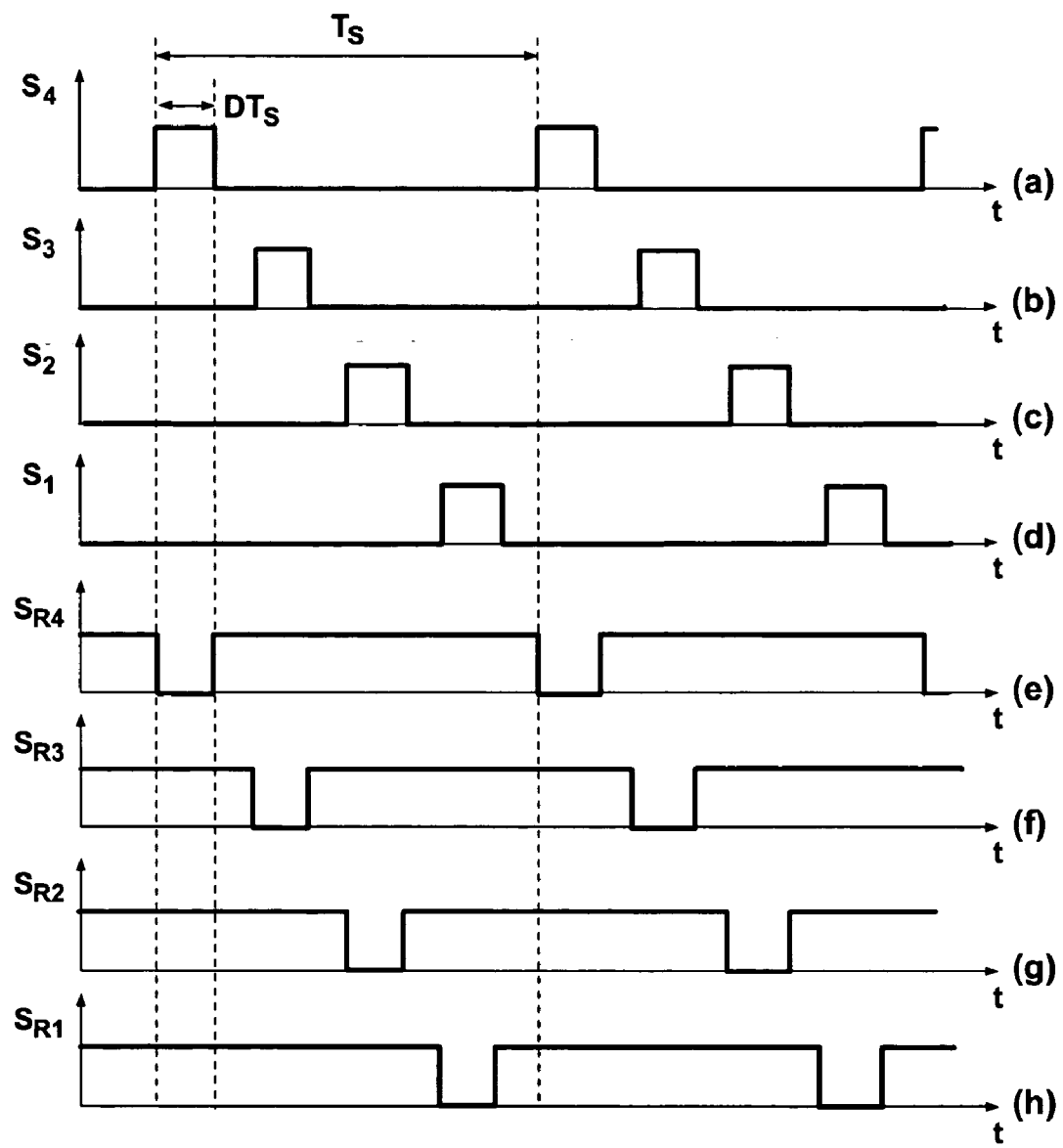
FIG. 14 shows the time diagrams of interleaved switch activation control signals for the circuit in FIG. 12.

FIG. 14 depicts an alternate scheme for the switching activation controls signals. This figure depicts the timing diagrams of switches $S_1$, $S_2$, $S_3$, and $S_4$ and synchronized rectifier switches $S_{R1}$, $S_{R2}$, $S_{R3}$ and $S_{R4}$ of the respective switching power converter stages depicted in FIG. 12 according to the switch activation control signals. In this embodiment, respective duty cycles of the switches on adjacent switching power converter stages are phase-shifted by $T_S/4$, wherein each switch conducts during a phase-shifted duty cycle that is out of phase with all of the other switches. The phase-shifted intervals are separated by 90 degrees. Since the activation of switches $S_1$, $S_2$, $S_3$, and $S_4$ occur on phase-shifted intervals for the adjacent switching power converter stages, the output current ripple of the power conversion system is reduced, and the size of the output capacitor is minimized. FIG. 14(a) depicts the activation waveform of switch $S_4$, FIG. 14(b) depicts the activation waveform of switch $S_3$, FIG. 14(c) depicts the activation waveform of switch $S_2$, FIG. 14(d) depicts the activation waveform of switch $S_1$, FIG. 14(e) depicts the activation waveform of synchronized rectifier switch $S_{R4}$, FIG. 14(f) depicts the activation waveform of synchronized rectifier switch $S_{R3}$, FIG. 14(g) depicts the activation waveform of synchronized rectifier switch $S_{R2}$, and FIG. 14(h) depicts the activation waveform of synchronized rectifier switch $S_{R1}$. It would be appreciated that switch $S_4$ and synchronized rectifier switch $S_{R4}$ are conducting at complementary intervals. The switch $S_4$ conducts during the duty cycle of its switching power converter stage, whereas the synchronized rectifier switch $S_{R4}$ conducts during the remainder to the switching cycle $T_S$. The same relationship applies to the other switches and synchronized rectifier switches on the remaining switching power converter stages, respectively.

The voltage-conversion ratio of the circuit in FIG. 12 is given by $$\frac{V_0}{V_{IN}} = \frac{D}{4} \qquad (9)$$

when the converter operates with duty cycle D less than one-half for the driving scheme in FIG. 13, and with duty cycle D less than one-fourth for the driving scheme in FIG. 14. When the converter operates with overlapped switch activation control signals, i.e., with a duty cycle greater than one-half for the driving scheme in FIG. 13, or with a duty cycle greater than one-fourth for the driving scheme in FIG. 14, the voltage conversion ratio monotonically changes from D/4 to 1.

Figure 15:
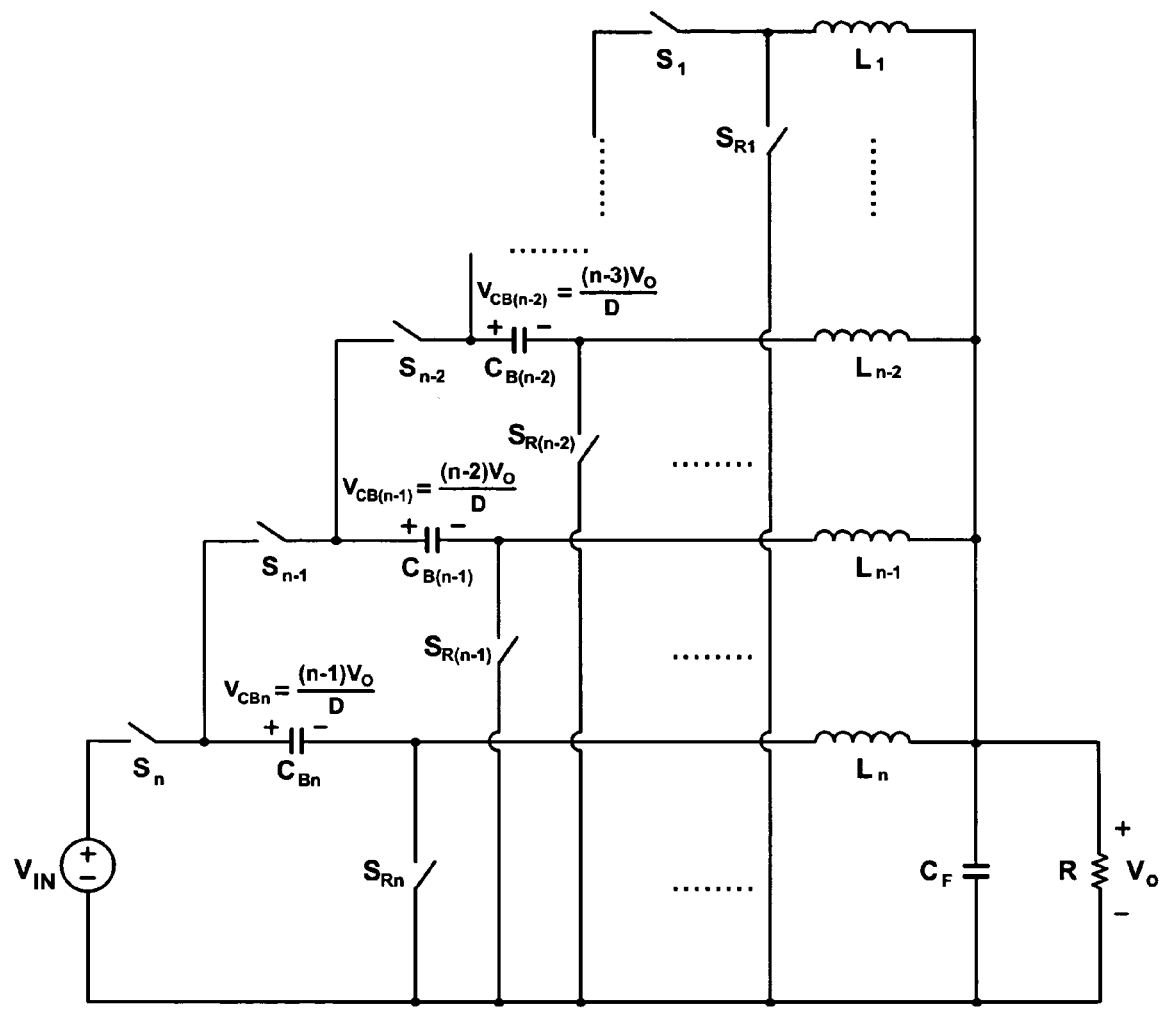
FIG. 15 shows a n-stage non-isolated n-switch, n-inductor, cascaded step-down power converter of this invention.

FIG. 15 shows an arrangement where n-switching power converter stages are used in accordance with the present invention, where n is any integer. The voltage conversion ratio of the circuit is $$\frac{V_0}{V_{IN}} = \frac{D}{n} \qquad (10)$$

for the operation where the switch activation control signals of the switches on adjacent switching power converters are not overlapped, i.e., for D<1/n. If the switch activation control signals of the switches on adjacent switching power converter stages are overlapped (D>1/n), the voltage conversion ratio of the converter monotonically increases from D/n to 1 as duty cycle D increases. Similar to FIG. 13, the duty cycles of corresponding switches of the even switching power converter stages of the n-switch power converter may be activated simultaneously out of phase with the odd switching power converter stages, where the even converters are activated at phase-shifted intervals relative to the odd converters. Otherwise, each switching power converter stage may be activated at phase-shifted intervals of $T_S/n$, where all of the switches are out of phase, similar to the description of FIG. 14.

According to another embodiment of the invention, a step-up power conversion system provides regulated high-voltage outputs from low-voltage inputs. The step-up power conversion system employs multiple switching power converter stages with diode rectifiers connected in series between an output stage and an input stage. In this embodiment, the input stage comprises a voltage source, and the output stage comprises an output capacitor. A switching power converter stage comprises a switch, an inductor, and a diode rectifier. Between each pair of series-connected diode rectifiers is a junction point that is connected to an inductor through one or more energy storage devices. The switching power converter stages that share a junction point are adjacent, and two or more switching power converter stages coupled together are cascaded. The energy storage devices may be blocking capacitors.

During the steady state operation, these blocking capacitors are temporarily charged to provide the same volt-second product across each individual inductor of the switching power converter stage. It should be noted that the step-up power conversion system of the invention does not require an extremely large duty cycle to provide very high-voltage output in comparison with its conventional boost converter counterpart. In addition, the voltage stress on most of the semiconductor components in the power conversion system of the present invention is also reduced, since it is equal to the output voltage divided by the number of inductors. As such, the step-up power conversion system of the present invention operates with a reduced switching loss, and can employ more efficient low-voltage rated semiconductor devices.

FIGS. 16–23 show examples of non-isolated step-up cascaded switching power converter stage topologies of this invention and their corresponding voltage, current, and switch activation control signal waveforms. These step-up power converters are suitable for applications where high-voltage output is generated from low-voltage input.

Figure 16:
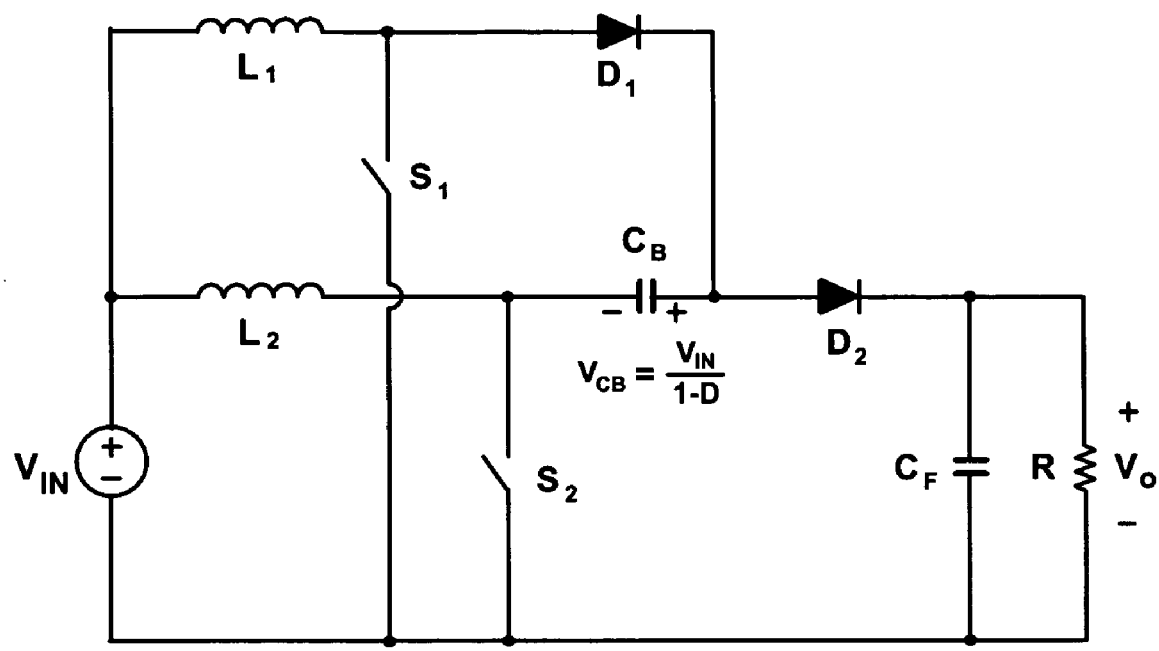
FIG. 16 shows a 2-stage non-isolated two-switch, two-inductor, cascaded step-up power converter of this invention.

FIG. 16 shows a 2-stage non-isolated two-switch, two-inductor, cascaded step-up switching power converter of this invention. The depicted power conversion system employs two diode rectifiers $D_1$ and $D_2$, connected in series with inductors $L_1$ and $L_2$, respectively, to the output stage. Between diode rectifiers $D_1$ and $D_2$ is a junction point connected to input inductor $L_1$ through blocking capacitor $C_B$. In steady state, the voltage across the blocking capacitor $C_B$ is proportional to the input voltage $V_{IN}$ and the duty cycle D. In this embodiment, a first step-up switching power converter stage comprises switch $S_1$, inductor $L_1$, and diode rectifier $D_1$, and a second step-up switching power converter stage comprises switch $S_2$, inductor $L_2$, and diode rectifier $D_2$. Switching power converter stages that share a junction point are adjacent switching power converters, therefore the first and second switching power converter stages are adjacent switching power converters. The first and second switching power converter stages are also cascaded because they are interconnected. The input stage applies voltage $V_{IN}$ to the cascaded switching power converter stages, which is output at the output stage.

Figure 17:
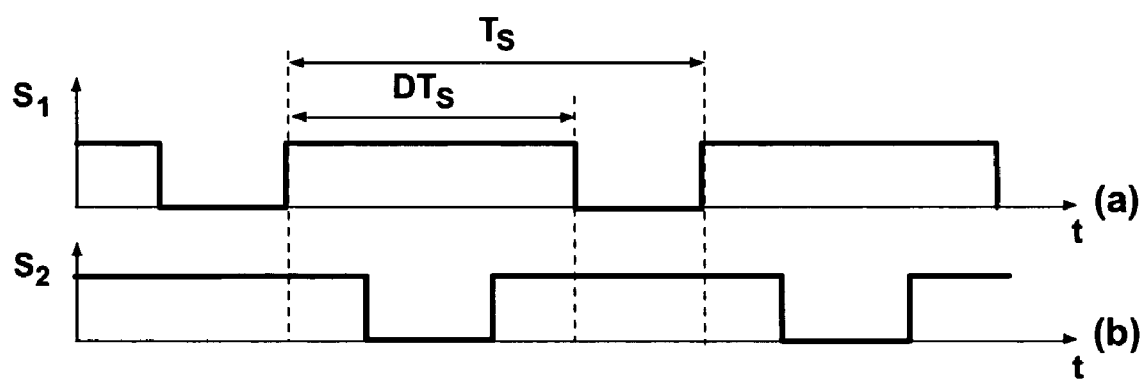
FIG. 17 shows the activation timing diagrams of the switch activation control signals for the circuit in FIG. 16.

FIG. 17 depicts the activation waveforms for switches $S_1$ and $S_2$ of the corresponding switching power converter stages according to switching control activation signals in FIG. 16. FIG. 17(a) illustrates the activation waveform of switch $S_1$, and FIG. 17(b) illustrates the activation waveform of switch $S_2$. Switches $S_1$ and $S_2$ operate according to a duty cycle D, which has a fractional relationship with the switching cycle $T_S$. It is noted that the duty cycle for switch $S_1$ is phase-shifted, i.e., delayed, by 180 degrees relative to switch $S_2$. In contrast to the step-down power converter, the duty cycle of the step-up converter is overlapped (D>0.50), wherein both switches are conducting during the same interval during the switch transitions of switching cycle $T_S$. This implies both of the switches are conducting during the transitions. As illustrated, switch $S_2$ conducts during the period when switch $S_1$ is turned off, and switch $S_1$ conducts during the period when switch $S_2$ is turned off. As a result, the energy in inductor $L_1$ stored during the time when switch $S_1$ turns on is delivered to blocking capacitor $C_B$ when switch $S_1$ turns off.

In the steady state, the voltage at the output stage across blocking capacitor $C_B$ can be found from the volt-second balance equation for $L_1$, which is $$V_{IN}DT_S = (V_{CB} - V_{IN})(T_S - DT_S) \tag{11}$$

From Eq. (11), voltage $V_{CB}$ across blocking capacitor $C_B$ is $$V_{CB} = \frac{V_{IN}}{1-D}. \tag{12}$$

The voltage conversion ratio of the power conversion system can be calculated from the volt-second balance of input inductor $L_2$ and Eq. (12). Since the volt-second balance equation for $L_2$ is $$V_{IN}DT_S = (V_O - V_{CB} - V_{IN})(T_S - DT_S), \tag{13}$$

from Eqs. (12) and (13), the voltage conversion ratio of the converter in FIG. 16 is given by $$\frac{V_0}{V_{IN}} = \frac{2}{1-D} \tag{14}$$

when the converter operates with duty cycle D greater than 0.5. As can be seen from Eq. (14), the output voltage of the power conversion system is twice the output voltage of the conventional boost converter when they operate with the same duty cycle. This high conversion ratio makes the switching power conversion system suitable for applications with a high difference between the input and output voltages, since the power conversion systems do not require extremely large switch activation control signals to deliver a high voltage output. It should be noted that the converter has a non-linear voltage conversion ratio that depends on duty cycle D. When the converter operates with duty cycle D at less than 0.5, the voltage conversion ratio is $$\frac{V_0}{V_{IN}} = \left(\frac{1}{1-D}\right)^2. \tag{15}$$

As can be seen from FIG. 16, the blocking voltage of switch $S_1$ and diode rectifier $D_1$ is equal to the voltage across blocking capacitor $C_B$, which is one-half of output voltage $V_O$ as it can be derived from Eqs. (12) and (14). The blocking voltage of switch $S_2$ and diode rectifier $D_2$ is equal to the voltage difference between output voltage $V_O$ and blocking capacitor voltage $V_{CB}$, which is also one-half of output voltage $V_O$. As a result, the voltage stress of most semiconductor components is only one-half of the output voltage, which makes the switching power converter stage operate with small switching losses and employ efficient low-voltage rated semiconductor devices. In this way, the blocking capacitor $C_B$ temporarily stores energy during a switching cycle for delivery to the output stage such that the temporarily stored energy is proportional to the duty cycle. Similar to the step-up power converter, the duty cycle and the switching cycle have a fractional relationship with each other. The duration of the duty cycle D will always be within the duration of the switching cycle $T_S$.

Figure 18:
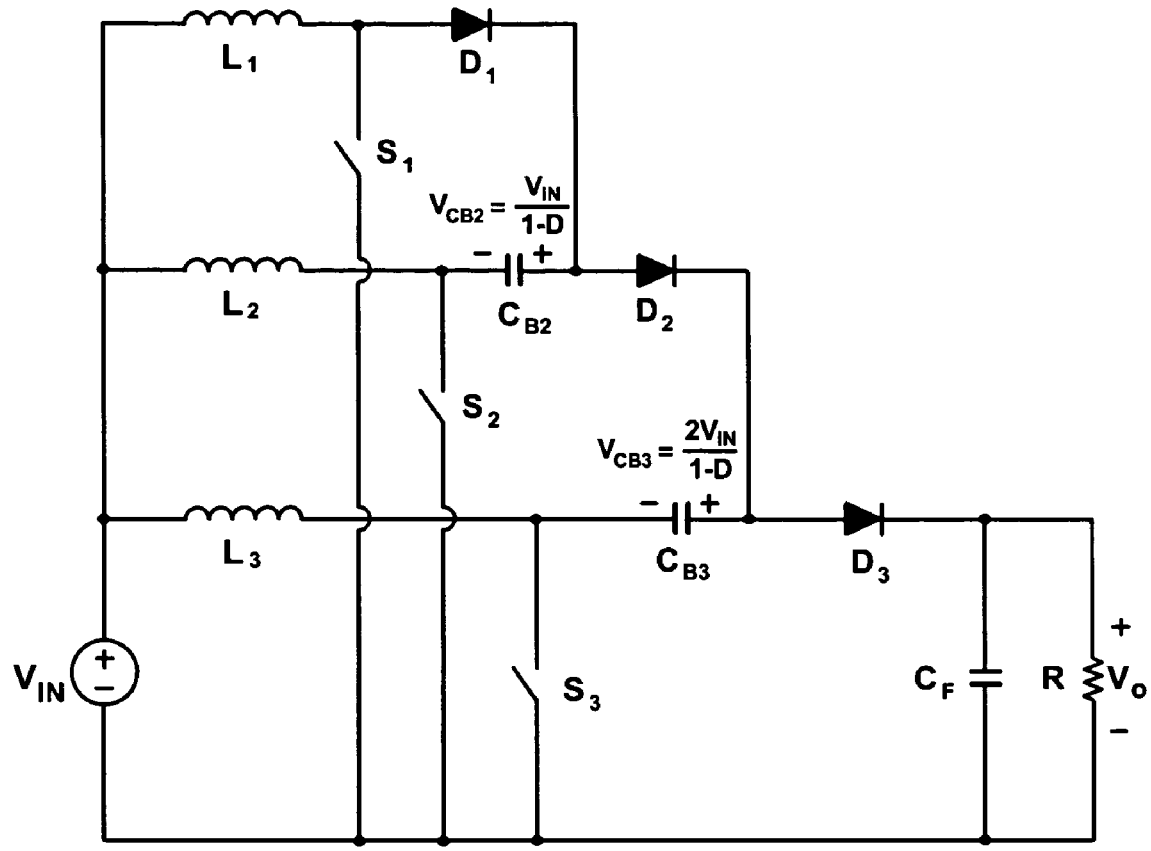
FIG. 18 shows a 3-stage non-isolated three-switch, three-inductor, cascaded step-up power converter of this invention.

FIG. 18 shows a 3-stage non-isolated three-switch, three-inductor, cascaded step-up switching power converter stage of this invention. The activation of switches $S_1$, $S_2$, and $S_3$ is phase-shifted between the corresponding switching power converter stages, as illustrated and will be described in FIG. 19. As shown in FIG. 18, the power conversion system employs three diode rectifiers, $D_1$, $D_2$, and $D_3$, connected in series between input inductor $L_1$ and output capacitor $C_F$. Between diode rectifiers $D_2$ and $D_3$ is a first junction point that connects to input inductor $L_3$ through blocking capacitor $C_{B3}$. Between diode rectifiers $D_1$ and $D_2$ is a second junction point that connects to input inductor $L_2$ through blocking capacitor $C_{B2}$.

In this embodiment, the first switching power converter stage comprises switch $S_1$, inductor $L_1$, and diode rectifier $D_1$, the second switching power converter stage comprises switch $S_2$, inductor $L_2$, and diode rectifier $D_2$, and the third switching power converter stage comprises switch $S_3$, inductor $L_3$, and diode rectifier $D_3$. Switching power converter stages that share a junction point are adjacent switching power converters, and since the three switching power converter stages are coupled together, they are cascaded. In steady state, the voltage across a blocking capacitor is determined by the switching power converter stages where the junction point is connected to, the input voltage, and the duty cycle. As a general rule, the number of the lower numbered stage for the adjacent switching power converter stages is multiplied by the input voltage $V_{IN}$, and is divided by one minus the duty cycle. Accordingly, for blocking capacitor $C_{B3}$ attached to the junction point between the second and third switching power converter stages, the voltage $V_{CB3}$ across capacitor $C_{B3}$ is two multiplied by input voltage $V_{IN}$, and divided by one minus the duty cycle (1−D).

The activation of switches is phase-shifted, i.e., delayed, 120 degrees in the corresponding switching power converter stages. During steady state operation, blocking capacitors $C_{B2}$ and $C_{B3}$ maintain DC voltages to provide the same volt-second condition across inductors $L_1$, $L_2$, and $L_3$. The voltage conversion ratio of the circuit can be calculated from the volt-second balance of each inductor, which is $$\frac{V_O}{V_{IN}} = \frac{3}{1-D} \quad (16)$$

when it operates with duty cycle D greater than one-third. As can be seen from Eq. (16), the output voltage of the power conversion system in FIG. 18 is three times the output voltage of a conventional boost converter when they operate with the same duty cycle. When the converter operates with a duty cycle of less than one-third, the voltage conversion ratio monotonically increases from 1 to 3/(1−D).

Figure 19:
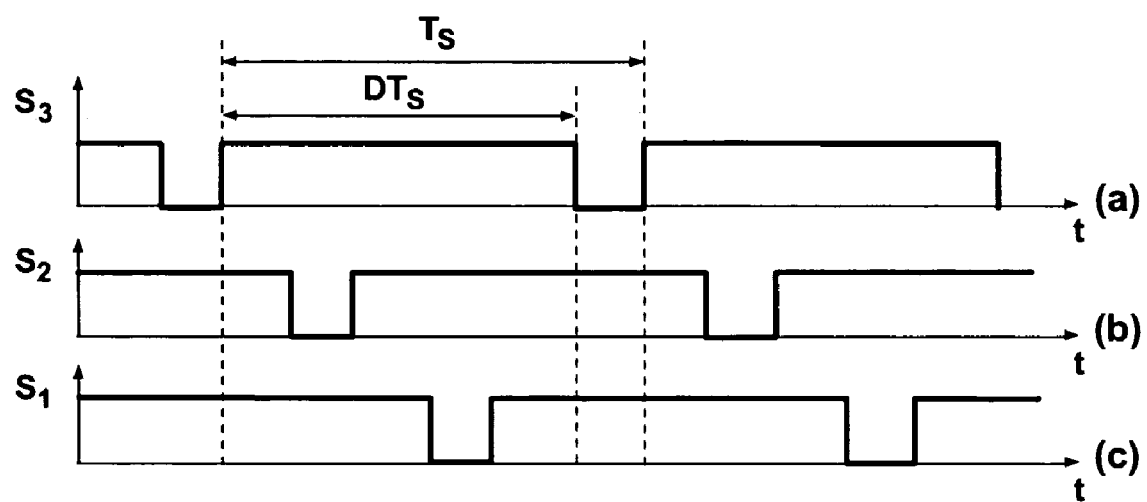
FIG. 19 shows the activation timing diagrams of the switch activation control signals for the circuit in FIG. 18.

FIG. 19 depicts the timing diagrams of switches $S_1$, $S_2$, and $S_3$ of the corresponding switching power converter stages according to switching control activation signals in the circuit of FIG. 18. FIG. 19(a) illustrates the activation waveform of switch $S_3$, FIG. 19(b) illustrates the activation waveform of switch $S_2$, and FIG. 19(c) illustrates the activation waveform of switch $S_1$. Switches $S_1$, $S_2$, and $S_3$ operate with duty cycle D, which has a fractional relationship with the switching cycle $T_S$. It is noted that the duty cycles for the respective switches are phase-shifted, i.e., delayed, by 120 degrees relative to one another, which makes all of the switches out of phase with one another. Similar to FIG. 17, the duty cycles overlap indicating that at least one switch is conducting at all times.

Figure 20:
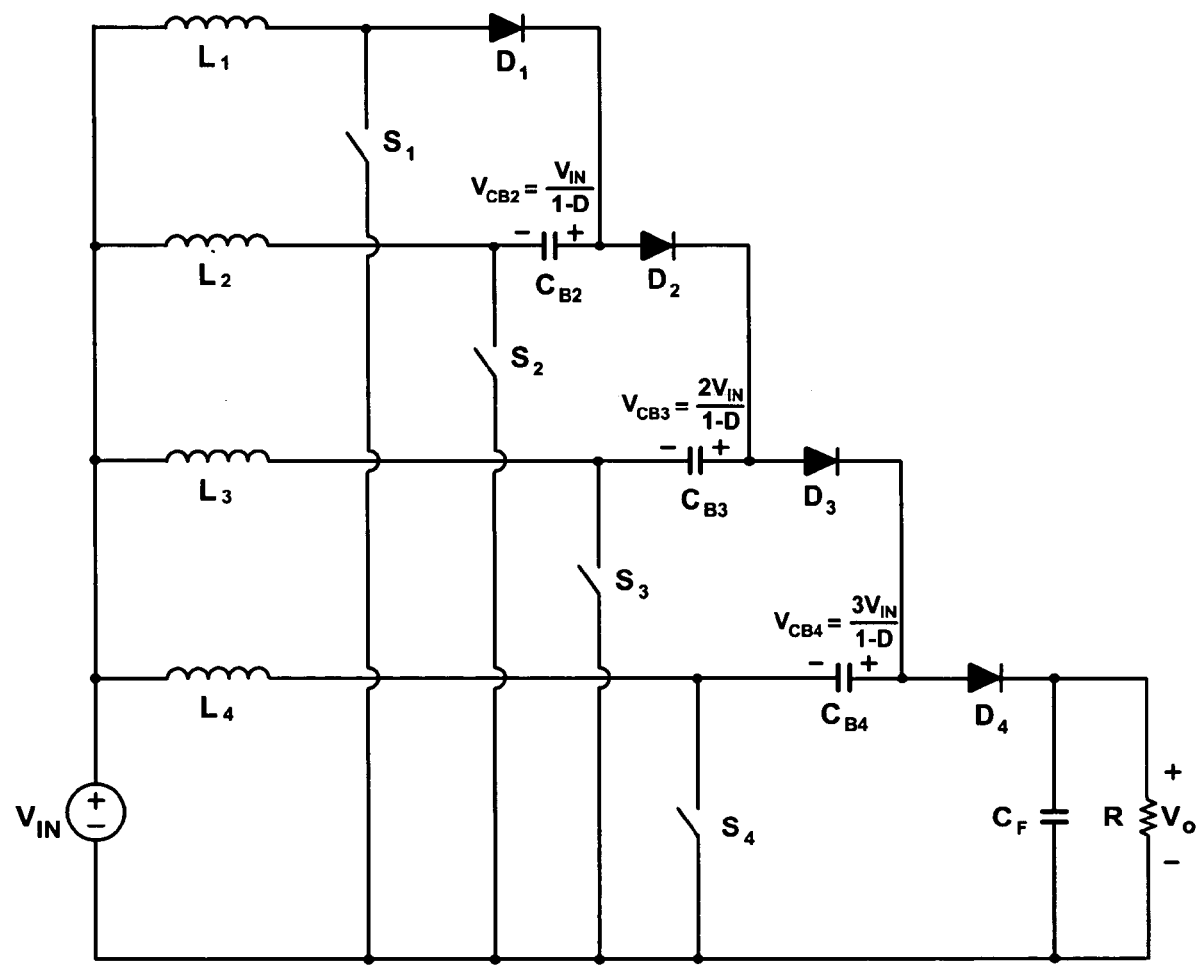
FIG. 20 shows a 4-stage non-isolated four-switch, four-inductor, cascaded step-up power converter of this invention.
Figure 21:
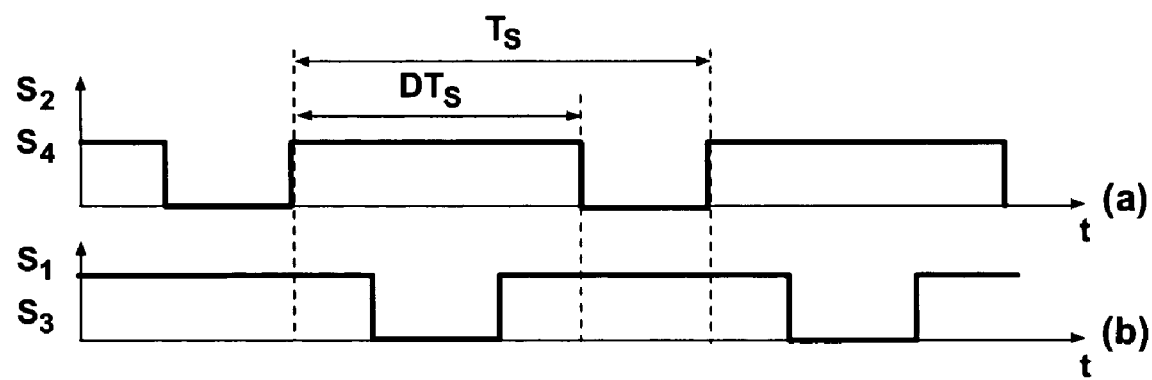
FIG. 21 shows the activation timing diagrams of the switch activation control signals for the circuit in FIG. 20.

FIG. 20 shows a 4-stage non-isolated four-switch, four-inductor, cascaded step-up switching power converter stage of this invention. In this figure, four step-up switching power converter stages are depicted, and the converters are identified similar to the step-up switching power converter stages of FIG. 18. The voltage conversion ratio of the circuit, which is controlled by the switch activation control signals shown in FIG. 21, is $$\frac{V_O}{V_{IN}} = \frac{4}{1-D} \quad (17)$$

when the converter operates with duty cycle D larger than one-half. When the converter operates with a duty cycle of less than one-half, the voltage conversion ratio monotonically changes from 1 to 4/(1−D). The converter that operates with the interleaved switch activation control signals, shown in FIG. 22, has the same voltage conversion ratio described as in Eq. (17) if it operates with duty cycle D greater than one-fourth.

Figure 22:
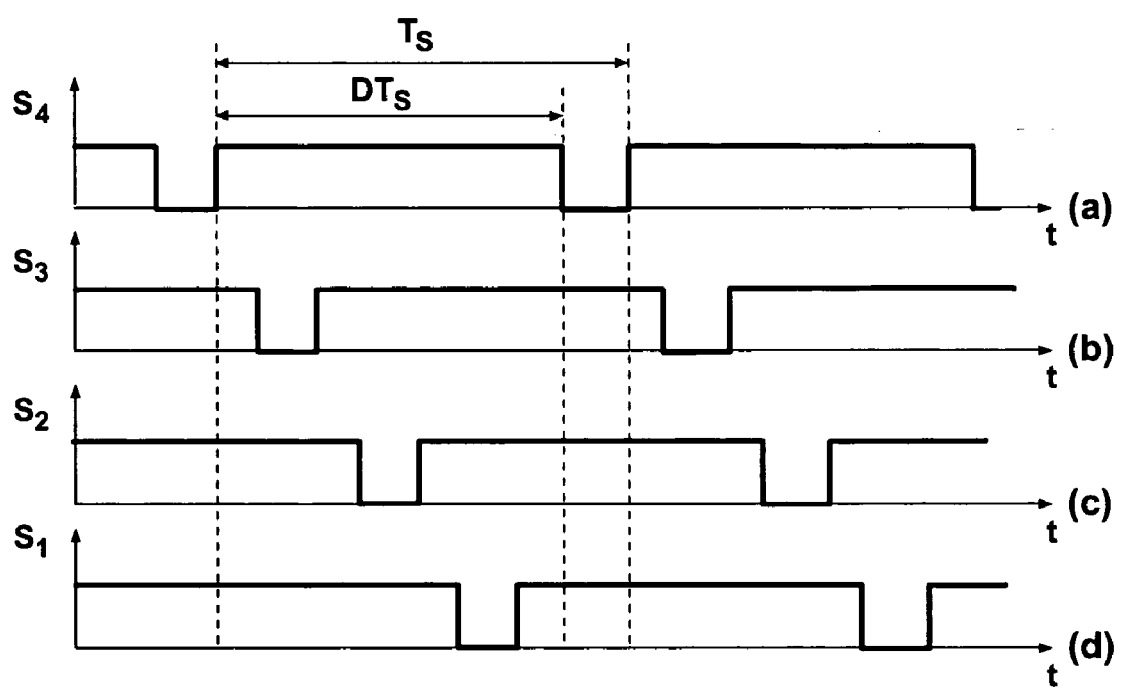
FIG. 22 shows the activation timing diagrams of the interleaved switch activation control signals for the circuit in FIG. 20.

When the converter operates with a duty cycle of less than one-fourth, the voltage conversion ratio monotonically increases from 1 to 4/(1−D) as duty cycle D increases from zero to one-fourth. The corresponding switches of the switching power converter stages from FIGS. 21 and 22 may be activated similar to the description from FIGS. 13 and 14, respectively. FIG. 21 depicts the corresponding switches of the even switching power converter stages being activated simultaneously out of phase with the activation of the odd switching power converter stages. In this embodiment, the odd converters are phase-shifted 180 degrees relative to the even converters. FIG. 22 depicts each switch of the corresponding switching power converter stage being activated at intervals phase-shifted by $T_S/4$, relative to the other switches.

Figure 23:
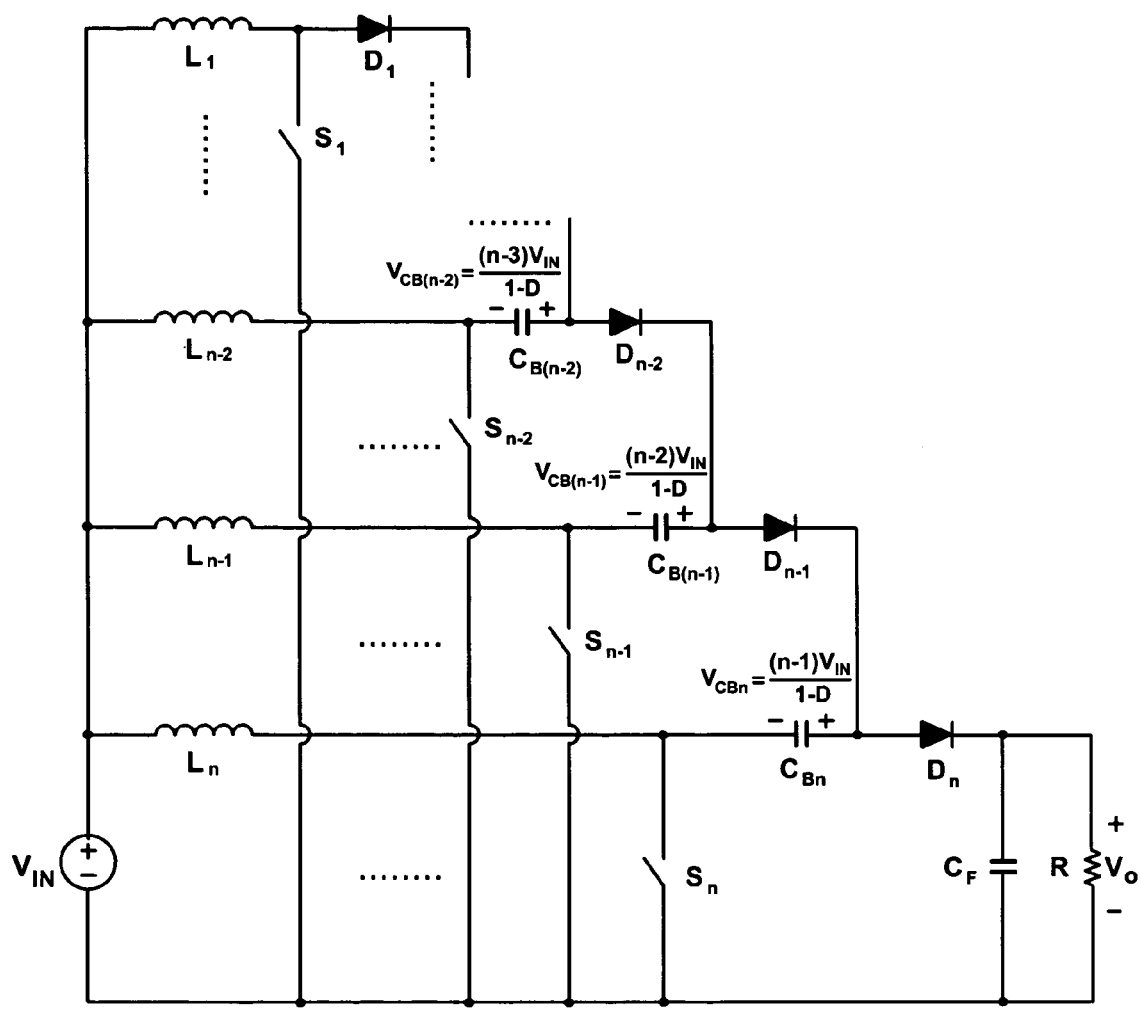
FIG. 23 shows a n-stage non-isolated n-switch, n-inductor, cascaded step-up power converter of this invention.

FIG. 23 shows a n-stage non-isolated n-switch, n-inductor, cascaded step-up power converter of this invention where n is any integer. The voltage conversion ratio of the circuit is $$\frac{V_O}{V_{IN}} = \frac{n}{1-D} \quad (18)$$

if the switch activation control signals for the switches of adjacent switching power converters are overlapped. If the switch activation control signals for the switches of adjacent switching power converters are not overlapped when duty cycle D of the converter is small, the voltage conversion ratio of the converter monotonically increases from 1 to n/(1−D) as duty cycle D increases from zero.

This embodiment of the present invention can be implemented in a variety of ways. Specifically, multiple pairs of switches, diode rectifiers, and capacitors can be connected in parallel to reduce the current stresses in the power conversion system. Also, the power conversion system could be connected in parallel for high current applications.

FIGS. 24–29 show non-isolated converters that have the same voltage conversion ratio as that of the converters shown in FIGS. 3 and 8 of this invention. The converters shown in FIGS. 24–29 have additional switches, capacitors, and inductors effectively connected in parallel to share the load current and reduce the peak current stress of the components for each of the switching power converter stages.

Figure 24:
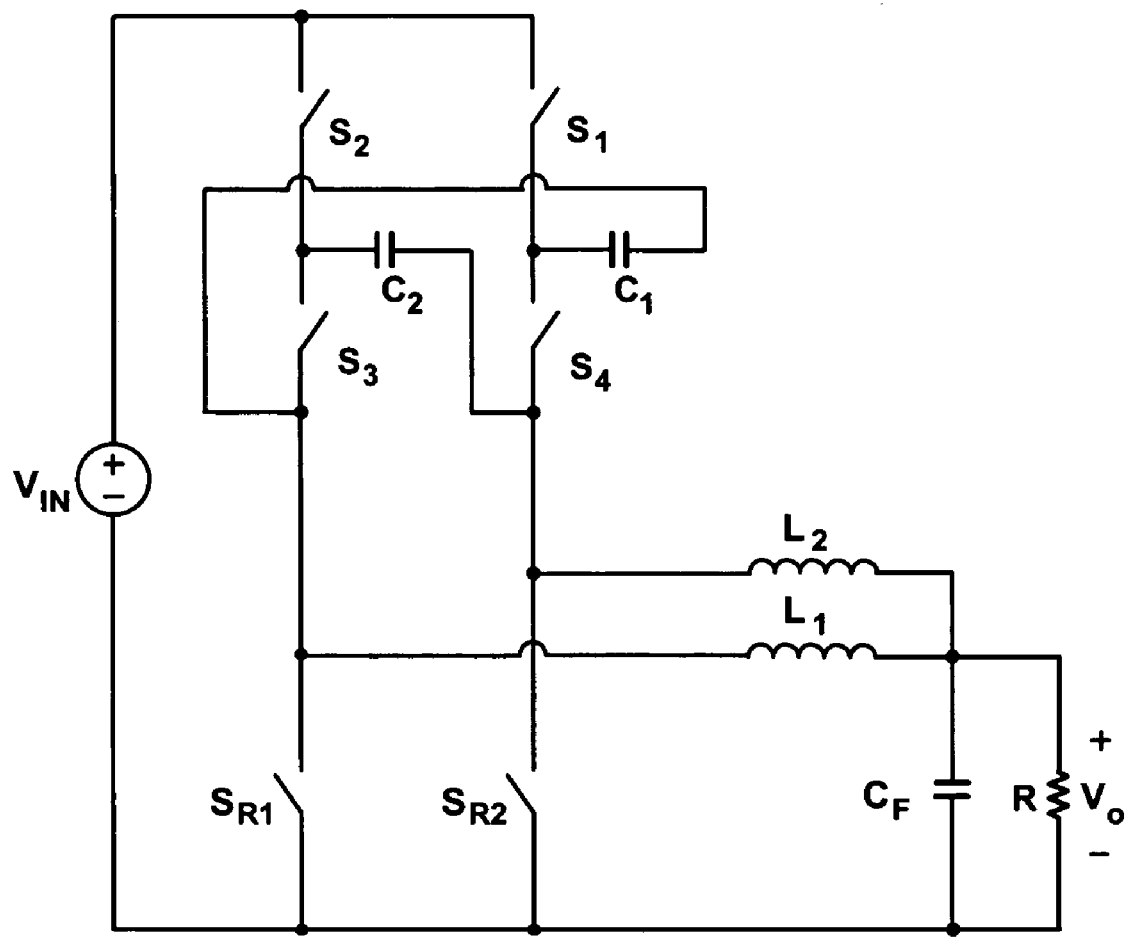
FIG. 24 shows a 2-stage non-isolated four-switch, two-inductor, cascaded step-down power of this invention.

FIG. 24 shows a 2-stage non-isolated four-switch, two-inductor, cascaded step-down switching power converter stage of this invention. In this embodiment, the energy storage device is embodied in two blocking capacitors $C_1$ and $C_2$, placed in parallel. The first switching power converter stage comprises switch $S_1$, switch $S_3$, inductor $L_1$, blocking capacitor $C_1$ and synchronized rectifier switches $S_{R1}$, the second switching power converter stage comprises switch $S_2$, switch $S_4$, inductor $L_2$, blocking capacitor $C_2$, and synchronized rectifier switches $S_{R2}$. The first and second switching power converter stages are coupled between the input stage and the output stage. In this embodiment, the input stage comprises a voltage source, and the output stage comprises an output capacitor.

Figure 25:
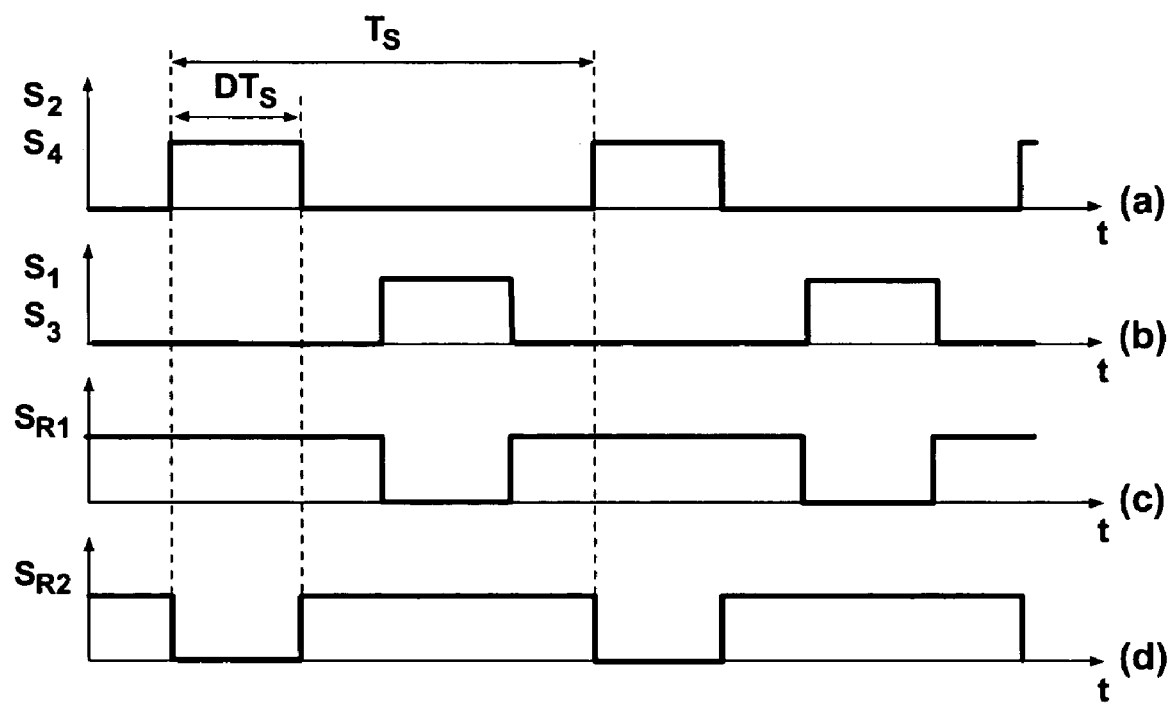
FIG. 25 shows the activation timing diagrams of the switch activation control signals for the circuit in FIG. 24.

FIG. 25 depicts the timing diagrams for switches $S_1$, $S_2$, $S_3$, and $S_4$ and synchronized rectifier switches $S_{R1}$ and $S_{R2}$ of respective switching power converter stages depicted in FIG. 24 according to the switching activation controls signals. As depicted, switches $S_1$ and $S_3$ from the first switching power converter stage conduct during the same duty cycle, as do switches $S_2$ and $S_4$ of the second switching power converter stage. The respective sets of switches on the different switching power converter stages are activated at phase-shifted intervals of 180 degrees, wherein switches $S_1$ and $S_3$ are out of phase with switches $S_2$ and $S_4$. Because the activation of switches $S_1$, $S_2$, $S_3$, and $S_4$ is phase-shifted between the first and second sets of switching power converter stages, the output current ripple of the power conversion system is reduced, and the size of the output filter capacitor is minimized. FIG. 25(a) depicts the concurrent activation of switches $S_2$ and $S_4$, FIG. 25(b) depicts the concurrent activation of switches $S_1$ and $S_3$, FIG. 25(c) depicts the activation of synchronized rectifier switch $S_{R1}$, and FIG. 25(d) depicts the activation of synchronized rectifier switch $S_{R2}$. It would be appreciated that switches $S_2$, $S_4$ and synchronized rectifier switch $S_{R2}$ are conducting at complementary intervals. The switches $S_2$, $S_4$ conduct during the duty cycle D of the second switching power converter stage, whereas synchronized rectifier switch $S_{R2}$ are conducting during the remainder to the switching cycle $T_S$. A similar relationship applies to switches $S_1$, $S_3$, and synchronized rectifier switch $S_{R1}$ of the first switching power converter stage.

Figure 26:
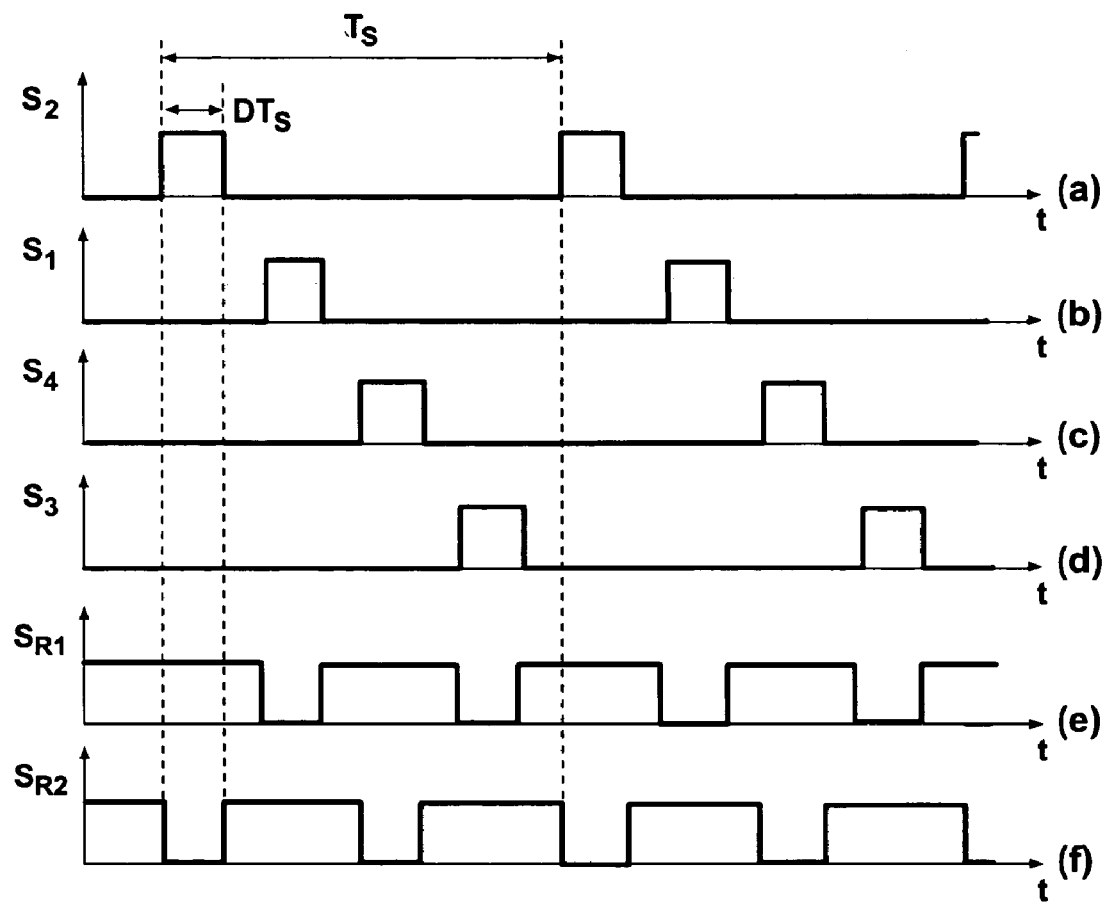
FIG. 26 shows the activation timing diagrams of the phase-shifted switch activation control signals for the circuit in FIG. 24.

FIG. 26 depicts the timing diagrams for switches $S_1$, $S_2$, $S_3$, and $S_4$ and synchronized rectifier switches $S_{R1}$ and $S_{R2}$ of the respective switching power converter stages depicted in FIG. 12 according to the switch activation control signals. In this embodiment, the activation of respective switches $S_1$, $S_2$, $S_3$, and $S_4$ are phase-shifted by $T_S/4$ of the corresponding switching power converter stages, wherein each switch conducts during phase-shifted duty cycles that are out of phase with all of the other switches, and the phase-shifted intervals are separated by 90 degrees. Since the activation of switches $S_1$, $S_2$, $S_3$, and $S_4$ is phase-shifted on adjacent switching power converter stages, the output current ripple of the power conversion system is reduced, and the size of the output capacitor is minimized. FIG. 26(a) depicts the activation waveform of switch $S_2$, FIG. 26(b) depicts the activation waveform of switch $S_1$, FIG. 26(c) depicts the activation waveform of switch $S_4$, FIG. 26(d) depicts the activation waveform of switch $S_3$, FIG. 26(e) depicts the activation of waveform synchronized rectifier switch $S_{R1}$, and FIG. 26(f) depicts the activation waveform of synchronized rectifier switch $S_{R2}$. It would be appreciated that switches $S_2$, $S_4$ and synchronized rectifier switch $S_{R2}$ are conducting at complementary intervals. Switches $S_2$, $S_4$ are conducting at out of phase relative to one another. The switches $S_2$, $S_4$ conduct during the duty cycle of their respective switching power converter stages, whereas the synchronized rectifier switch $S_{R2}$ conducts during the remainder to the switching cycle $T_S$. The same relationship applies to the switches $S_1$, $S_3$ and synchronized rectifier switch $S_{R1}$ on the first switching power converter stage.

The voltage conversion ratio of the circuit in FIG. 24, which is controlled by either of the switch activation control signals shown in FIGS. 25 and 26, is equal to the voltage conversion ratio described in Eq. (6) as long as the switch activation control signals of the adjacent switches in the converter are not overlapped. If the switch activation control signals of the corresponding switches of adjacent switching power converter stages are overlapped when duty cycle D of the converter increases, the voltage conversion ratio of the converter is equal to that described in Eq. (7). Each average current in the switches and the blocking capacitors is approximately one-half of those in the converter in FIG. 8.

Figure 27:
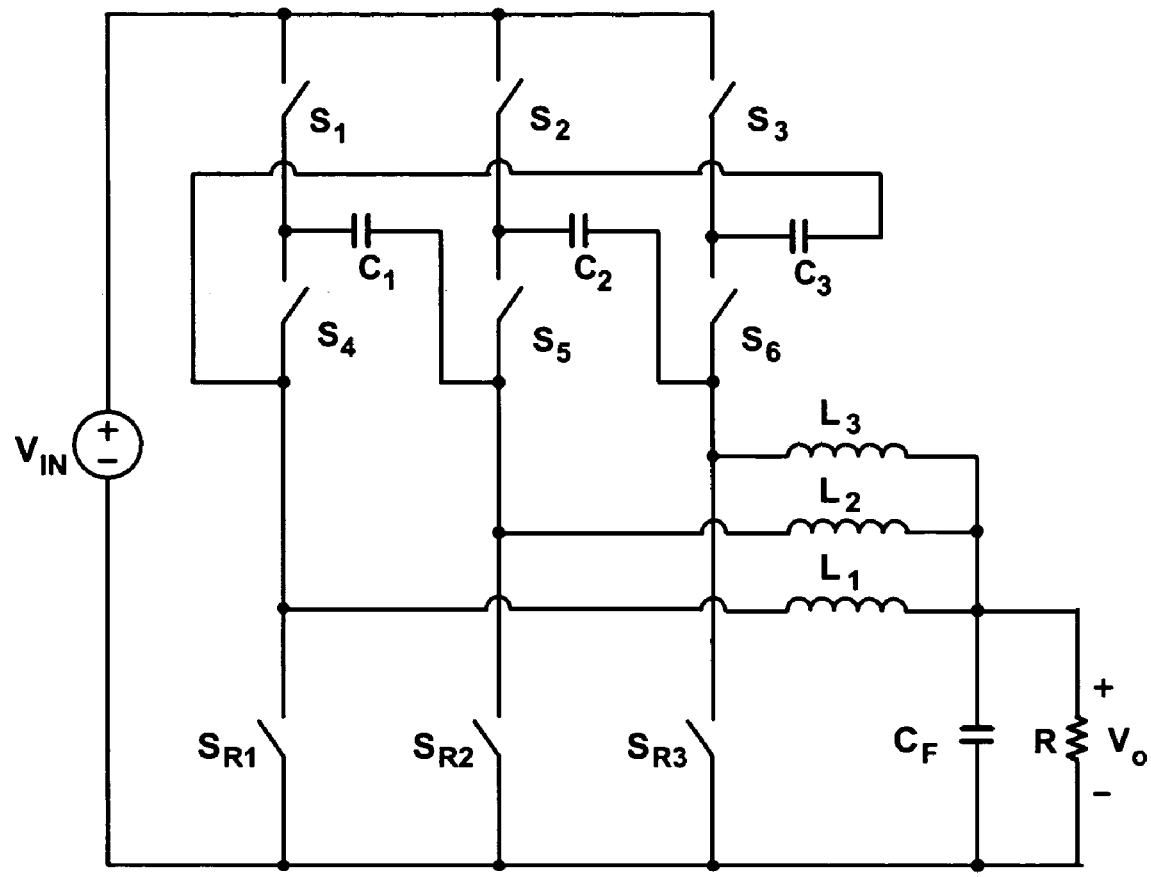
FIG. 27 shows a 3-stage non-isolated six-switch, three-inductor, cascaded step-down power converter of this invention.
Figure 28:
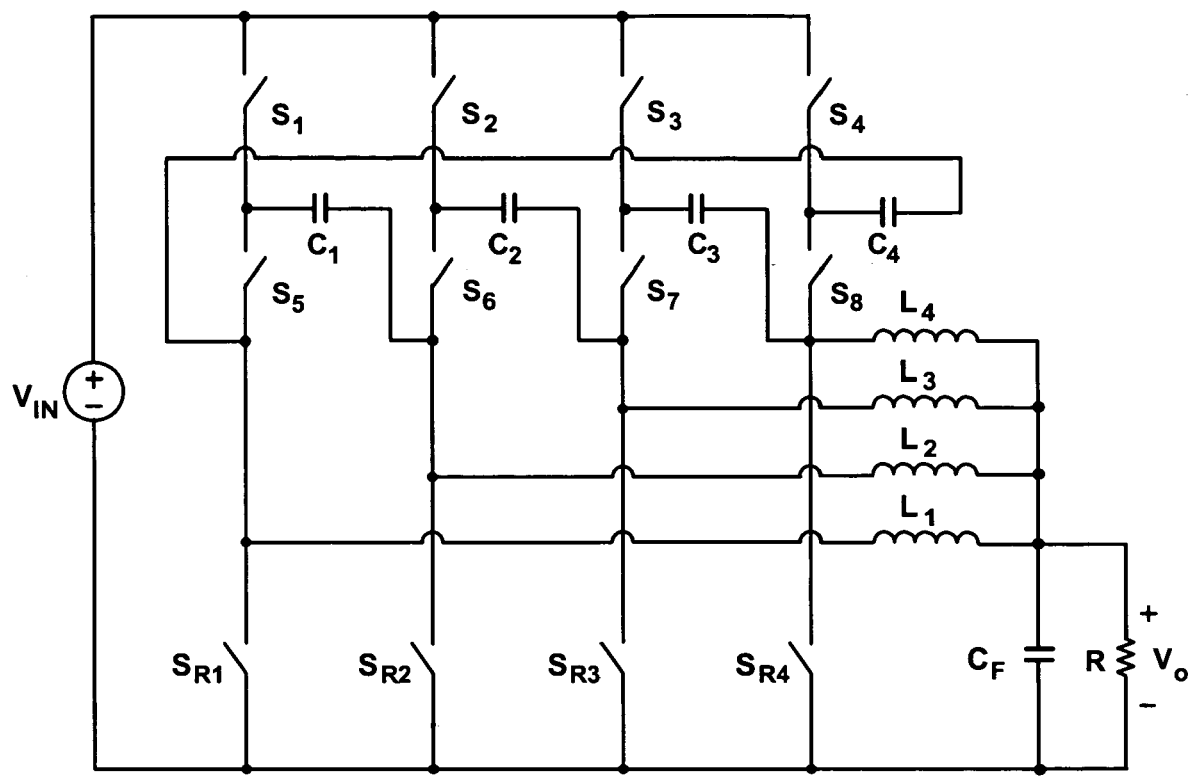
FIG. 28 shows a 4-stage non-isolated eight-switch, four-inductor, cascaded step-down power converter of this invention.
Figure 29:
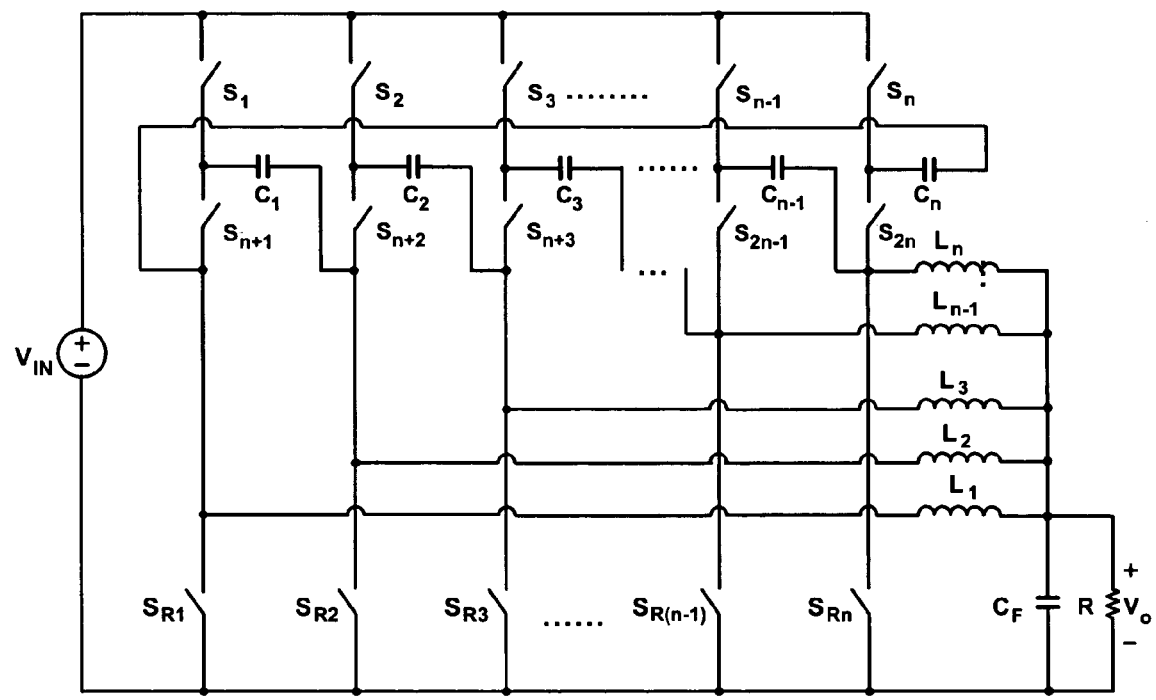
FIG. 29 shows a n-stage non-isolated 2n-switch, n-inductor, cascaded step-down power converter of this invention.

FIG. 27 and FIG. 28 show a 3-stage non-isolated six-switch, three-inductor, cascaded step-down power converter and a 4-stage non-isolated eight-switch, four-inductor, cascaded step-down power converter, respectively. FIG. 29 shows a n-stage non-isolated 2×n-switch, n-inductor, cascaded step-down power converter of this invention, where n can be any integer. The switching power converter stages are identified similarly to the description for FIG. 24.

Figure 30:
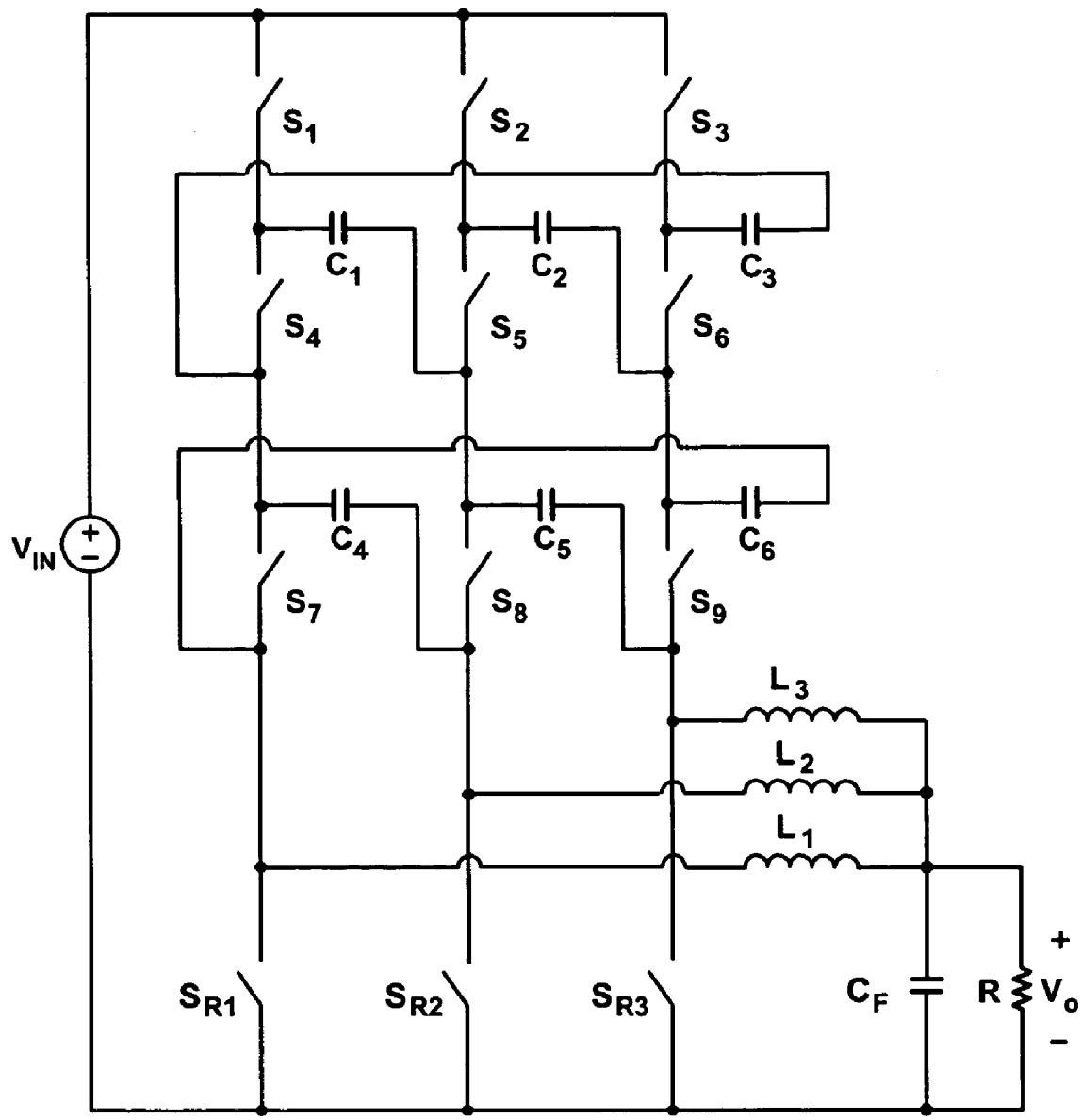
FIG. 30 shows a 3-stage non-isolated nine-switch, three-inductor, three-level, cascaded step-down power converter of this invention.

FIG. 30 shows a 3-stage non-isolated nine-switch, three-level, three-inductor cascaded power converter. The voltage conversion ratio of the circuit is equal to that of the converter in FIG. 10. The voltage conversion ratio is D/3, as described in Eq. (8), as long as the switch activation control signals of the adjacent switches in the converter are not overlapped. If the switch activation control signals of the adjacent switches are overlapped when duty cycle D of the converter is large, the voltage conversion ratio monotonically increases from D/3 to 1 as duty cycle D increases.

Figure 31:
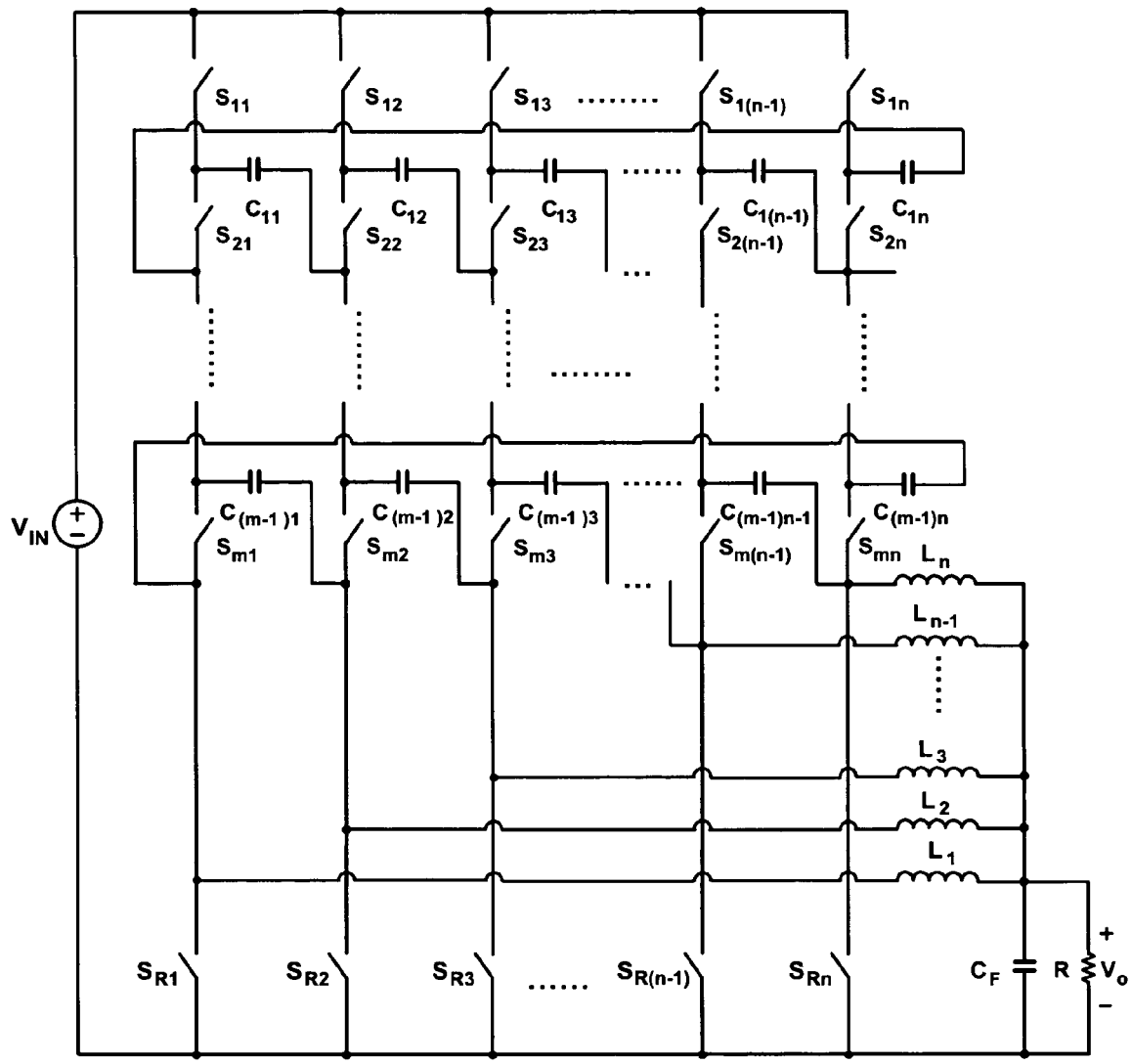
FIG. 31 shows a n-stage non-isolated m×n-switch, n-inductor, m-level, cascaded step-down power converter of this invention.

FIG. 31 shows a n-stage non-isolated m×n-switch, m-level, n-inductor cascaded power converter of this invention, where m and n can be any integers.

Figure 32:
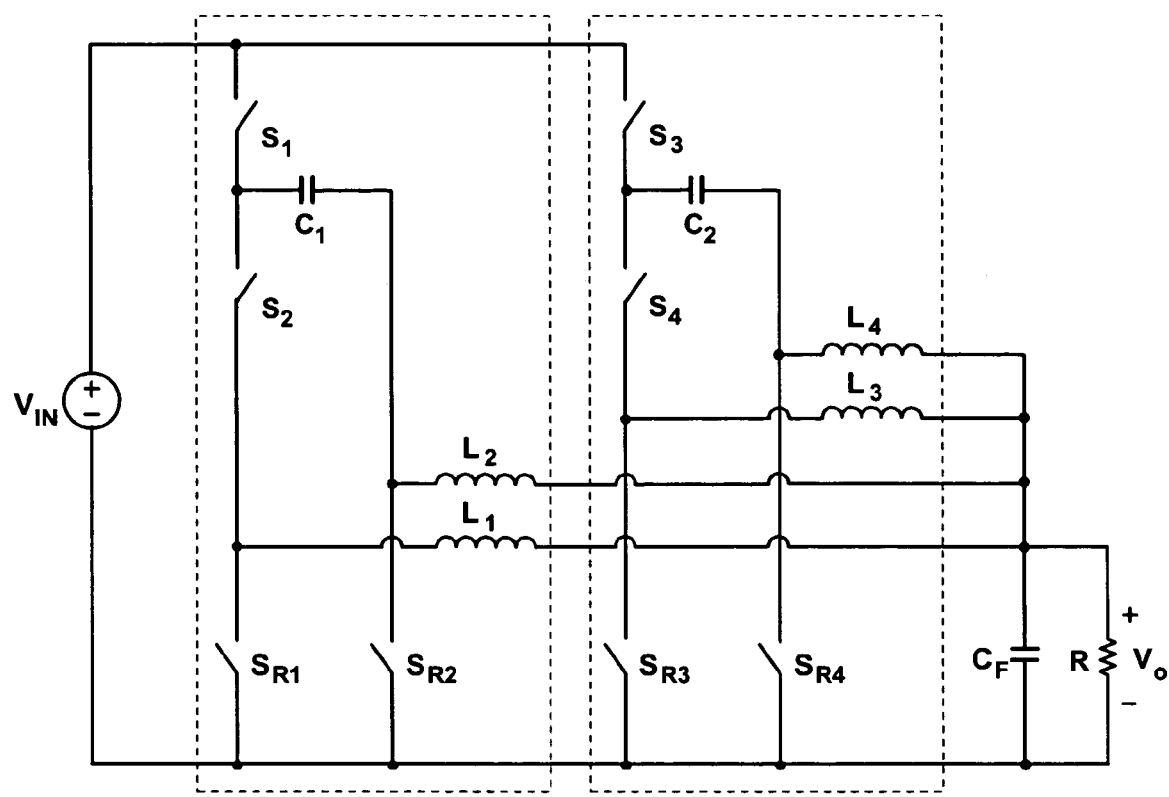
FIG. 32 shows a parallel power converter implementation of two 2-stage step-down power converter circuits from FIG. 8.

Finally, the circuits of this invention can be implemented in a variety of ways. Specifically, multiple pairs of switches and energy storage devices can be connected in parallel to reduce the current stresses for each of the switching power converter stages in the power conversion system. Also, more than two power conversion systems can be connected in parallel for high current applications. FIG. 32 shows an example of two parallel-connected non-isolated power converters from circuits depicted in FIG. 8.

FIG. 32 depicts two parallel 2-stage non-isolated power conversion systems connected between a single input stage and a single output stage. Each of the two power conversion systems comprises a 2-switch, 2-inductor cascaded switching power converter. The input stage comprises a voltage source, and the output stage comprises an output capacitor. In the present embodiment, the first cascaded switching power converter comprises switches $S_1$, $S_2$, energy storage device (or blocking capacitor) $C_1$, inductors $L_1$, $L_2$, and synchronized rectifier switches $S_{R1}$, $S_{R2}$. The second cascaded switching power converter comprises switches $S_3$, $S_4$, energy storage device (or blocking capacitor) $C_2$, inductors $L_3$, $L_4$, and synchronized rectifier switches $S_{R3}$, $S_{R4}$. The first and second cascaded switching power converters are coupled between the input stage and the output stage. In the present embodiment, the input stage comprises a voltage source $V_{IN}$, and the output stage comprises an output capacitor $C_F$. Coupled to the output capacitor is load R. The input stage is coupled to switches $S_1$ and $S_3$ of the respective cascaded switching power converters, and the output stage is coupled inductors $L_1$, $L_2$, $L_3$, and $L_4$ of the respective cascaded switching power converters. Through using multiple cascaded switching power converters in parallel, current stresses are reduced in the circuit components of the power conversion system. While the present embodiment depicts two power conversion systems connected in parallel, the device could be arranged to have any number of n-switch, n-inductor cascaded switching power converters in parallel, where n is an integer. Additionally, step-down and step-up power conversion systems may be coupled together in a buck-boost arrangement, without departing from the spirit or scope of the invention.

While various embodiments of the present invention have been described above, it should be understood that they have been presented by way of example only, and not limitation. Thus, the breadth and scope of the present invention should not be limited by any of the above described embodiments, but should instead by defined only in accordance with the following claims and their equivalents.

We claim:

1. A non-isolated power conversion system having an input for receiving an input voltage and an output for providing an output voltage comprising:
a plurality of cascaded switching power converter stages having a corresponding plurality of switches that are serially coupled to one of the input or the output, each of said plurality of switching power converter stages having at least one switch that is periodically activated according to a switching cycle having a duty cycle; and
at least one energy storage device coupled in series between the input and the output for dividing the input voltage, said at least one energy storage device temporarily storing energy during the switching cycle for delivery to the output such that the temporarily stored energy is proportional to the duty cycle.

2. The non-isolated power conversion system of claim 1, wherein the switching of corresponding switches of said plurality of switching power converter stages is phase shifted.

3. The non-isolated power conversion system of claim 1, wherein the at least one energy storage device is coupled to adjacent switching power converter stages.

4. The non-isolated power conversion system of claim 1, wherein the at least one energy storage device is a blocking capacitor.

5. The non-isolated power conversion system of claim 1, further comprising a junction point between switches from adjacent switching power converter stages, said junction point connects to the output through said at least one energy storage device and an inductor.

6. The non-isolated power conversion system of claim 1, wherein each of said plurality of switching power converter stages further comprise an inductor and a rectifier.

7. The non-isolated power conversion system of claim 6, wherein the rectifier is at least one of a diode rectifier or a synchronized rectifier switch.

8. The non-isolated power conversion system of claim 6, wherein the at least one energy storage device provides volt-second product balance of the inductor for each of said plurality of switching power converter stages.

9. The non-isolated power conversion system of claim 6, further comprising a junction point that connects rectifiers from adjacent cascaded switching power converter stages, said junction point is connected to at least one inductor through the at least one energy storage device.

10. The non-isolated power conversion system of claim 1, wherein multiple pairs of switches, inductors, and energy storage devices are arranged in parallel for each of said plurality of switching power converter stages.

11. The non-isolated power conversion system of claim 1, wherein a capacitor is coupled to the output.

12. The non-isolated power conversion system of claim 1, wherein the at least one energy storage device is charged to a fraction of an input voltage.

13. The non-isolated power conversion system of claim 1, wherein a power conversion ratio of the plurality of switching power converter stages is greater than or equal to one.

14. The non-isolated power conversion system of claim 1, wherein a power conversion ratio of the plurality of switching power converter stages is less than or equal to one.

15. The non-isolated power conversion system of claim 1, wherein a voltage of the at least one energy storage device is related to an input voltage and to a duty cycle.

16. The non-isolated power conversion system of claim 1, wherein a voltage of the at least one energy storage device is related to an output voltage and to a duty cycle.

17. The non-isolated power conversion system of claim 1, wherein the corresponding plurality of switches that are serially coupled to the input comprise controllable switches.

18. The non-isolated power conversion system of claim 1 the corresponding plurality of switches that are serially coupled to the output comprise diodes.

* * * * *